US009699282B2

(12) United States Patent
Zhong et al.

(10) Patent No.: US 9,699,282 B2
(45) Date of Patent: Jul. 4, 2017

(54) ELECTRONIC APPARATUS AND CONTROL METHOD

(71) Applicants: Beijing Lenovo Software Ltd., Haidian District, Beijing (CN); Lenovo (Beijing) Co., Ltd., Haidian District, Beijing (CN)

(72) Inventors: Zhaozhu Zhong, Beijing (CN); Yingjia Yao, Beijing (CN); Shaolian Liu, Beijing (CN)

(73) Assignees: BEIJING LENOVO SOFTWARE LTD., Haidian District, Beijing (CN); LENOVO (BEIJING) CO., LTD., Haidian District, Beijing (CN)

( * ) Notice: Subject to any disclaimer, the term of this patent is extended or adjusted under 35 U.S.C. 154(b) by 190 days.

(21) Appl. No.: 14/211,599

(22) Filed: Mar. 14, 2014

(65) Prior Publication Data
US 2014/0295915 A1    Oct. 2, 2014

(30) Foreign Application Priority Data

Mar. 29, 2013  (CN) .......................... 2013 1 0109305
Aug. 19, 2013  (CN) .......................... 2013 1 0361833

(51) Int. Cl.
*H04M 1/00*  (2006.01)
*H04M 1/02*  (2006.01)

(52) U.S. Cl.
CPC ....... *H04M 1/0272* (2013.01); *H04M 1/0245* (2013.01); *H04M 1/0214* (2013.01); *H04M 1/0254* (2013.01)

(58) Field of Classification Search
CPC ................................................... H04M 1/0272
See application file for complete search history.

(56) References Cited

U.S. PATENT DOCUMENTS

2006/0227122 A1* 10/2006 Proctor .................... G09G 3/20
345/204
2009/0141245 A1* 6/2009 Nozaki .................. G03B 21/14
353/56
(Continued)

FOREIGN PATENT DOCUMENTS

CN    1354409 A    6/2002
CN    1925511 A    3/2007
(Continued)

OTHER PUBLICATIONS

Office Action, and English language translation thereof, in corresponding Chinese Application No. 201310109305.1, dated Sep. 1, 2016, 54 pages.
(Continued)

*Primary Examiner* — Justin Lee
(74) *Attorney, Agent, or Firm* — Brinks Gilson & Lione; G. Peter Nichols

(57) ABSTRACT

The present invention provides an electronic apparatus and a control method. The electronic apparatus includes a main body provided with a display unit positioned at a first surface of the main body; an assistant body; a connecting device for connecting the main body and the assistant body; a status switching device for switching the working status of the electronic apparatus from a first status to a second status which is different from the first status when a positional relationship between the main body and the assistant body satisfies a preset condition.

18 Claims, 11 Drawing Sheets

(56) References Cited

U.S. PATENT DOCUMENTS

2010/0022274 A1* 1/2010 Roberts .............. H04M 1/0272
   455/566
2010/0099458 A1* 4/2010 Shin ................... H04M 1/0241
   455/556.1

FOREIGN PATENT DOCUMENTS

| CN | 101004639 A | 7/2007 |
| CN | 201311618 Y | 9/2009 |
| CN | 201750451 U | 2/2011 |
| CN | 102118484 A | 7/2011 |
| CN | 102193636 A | 9/2011 |
| CN | 102567103 A | 7/2012 |
| CN | 104345782 A | 2/2015 |

OTHER PUBLICATIONS

Office Action, and English language translation thereof, in corresponding Chinese Application No. 201310361833.6, dated Apr. 21, 2017, 10 pages.

Office Action, and English language translation thereof, in corresponding Chinese Application No. 201310109305.1, date Apr. 19, 2017, 49 pages.

* cited by examiner

ELECTRONIC APPARATUS AND CONTROL METHOD

BACKGROUND

This application claims priority to Chinese patent application No. 201310109305.1 filed on Mar. 29, 2013, and Chinese patent application No. 201310361833.6 filed on Aug. 19, 2013, the entire contents of which are incorporated herein by reference.

The present invention relates to the field of electronic technology, and in particular relates to an electronic apparatus and a control method.

With the development of electronic technology, more and more electronic apparatus such as mobile phone come into human's life, and bring convenience to human's life and work, which helps people to contact with each other at any time and everywhere.

However, the inventor found in the procedure of implementing the present invention that, in the prior arts, the form of a hand-held electronic apparatus such as mobile phone is generally straight type, and switch of the status of the electronic apparatus is inconvenient. For example, when people watch video, they need to enter the menu to select a video application, and then the video can be played. Likewise, for example, when people need to play picture, they need to enter the menu to find the corresponding picture to play. Especially with the development of the electronic technology, more and more applications are developed, so generally many applications are installed on the electronic apparatus, thus, the users need to find the application page by page, and the above problem is more obvious.

Therefore, there are the following defects in the prior arts: firstly, switch of the status is inconvenient, the procedure thereof is tedious and the operational efficiency is low; secondly, since the electronic apparatus is a straight type, it can't be positioned uprightly, and need additional attachment to be positioned uprightly.

SUMMARY

The embodiments of the present invention provide an electronic apparatus and a control method for solving the problem of low operational efficiency caused by the tedious procedure of the inconvenient switch of status in the prior arts.

One aspect of the embodiments of the present invention provides an electronic apparatus including: a main body provided with a display unit positioned at a first surface of the main body; an assistant body; a connecting device for connecting the main body and the assistant body; and a status switching device for switching working status of the electronic apparatus from a first status to a second status which is different from the first status when positional relationship between the main body and the assistant body satisfies a preset condition.

Optionally, a first instruction to which the electronic apparatus is able to respond in the first status is different from a second instruction to which the electronic apparatus is able to respond in the second status.

Optionally, a first display content of the display unit of the electronic apparatus in the first status is different from a second display content of the display unit of the electronic apparatus in the second status.

Optionally, a first resource occupied by the electronic apparatus in the first status is different from a second source occupied by the electronic apparatus in the second status.

Optionally, when the positional relationship between the main body and the assistant body satisfies different preset conditions, the corresponding second status is different.

Optionally, the working status is specifically: an application scene mode, and the first status and the second status are specifically: a first application scene mode and a second application scene mode; or The working status is specifically: a system status, and the first status and the second status are specifically: a first system status and a second system status, wherein the first system status is a normal operating status, and the second system status is a non-working status; or The working status is specifically: invoking an application, and the first status and the second status are specifically: invoking a first application and invoking a second application; wherein the first application is different from the second application; or The working status is specifically the collection of the operating system and hardware, the first status is a complete set of the collection of the first operation system and hardware, and the second status is a part of the collection of the second operation system and hardware.

Optionally, when the working status is specifically invoking an application, the electronic apparatus further includes: a processing unit for obtaining the current system status of the electronic apparatus; deciding whether the current system status is in the normal operating status or the non-working status; the status switching device is further specifically for: switching the current system status to the normal operating status when the current system status is in the non-working status and invoking the second application.

Optionally, the assistant body is detachably connected to the main body by the connecting device.

Optionally, the positional relationship between the main body and the assistant body satisfying the preset condition is specifically: the assistant body being connected to the main body or the assistant body being separated from the main body.

Optionally, when the number of the assistant body is greater than or equal to 2, the first status and the second status corresponding to each assistant body are different from each other.

Optionally, the assistant body is rotatable connected to the main body by the connecting device, and the assistant body includes an operational region which is for operating a display interface of the display unit, when the assistant body is in a second relative position with respect to the main body, in comparison to when the assistant body is in a first relative position with respect to the main body, a first operation body at the bottom of the electronic apparatus is more suitable for the user to hold to carry out an input operation to the operational region.

Another aspect of the embodiments of the present invention provides an electronic apparatus including: a main body provided with a display unit positioned at a first surface of the main body; a connecting device; an assistant body which is rotatable connected to the main body by the connecting device and includes an operational region which is for operating a display interface of the display unit; when the assistant body is in a second relative position with respect to the main body, in comparison to when the assistant body is in a first relative position with respect to the main body, a first operation body at the bottom of the electronic apparatus is more suitable for the user to hold to carry out an input operation to the operational region.

Optionally, the electronic apparatus further includes a processing unit, and the assistant body includes a micro-control unit for processing the input operation collected by the operational region as an instruction and feeding the instruction back to the processing unit.

Optionally, the electronic apparatus further includes a status switching device for switching the working status of the electronic apparatus from a first status to a second status which is different from the first status when the positional relationship between the main body and the assistant body satisfies the preset condition.

Optionally, the electronic apparatus further includes an instruction switching device for switching an instruction set to which the operational region is able to respond from a first instruction set in the first status to a second instruction set in the second status, wherein the first instruction set is not completely the same as the second instruction set.

Another aspect of the embodiments of the present invention provides a control method applied in an electronic apparatus including a main body, a connecting device, an assistant body and a status switching device, the assistant body is able to be connected to the main body by the connecting device, and the method includes: detecting whether a positional relationship between the main body and the assistant body satisfies a preset condition; switching working status of the electronic apparatus from a first status to a second status which is different from the first status by the status switching device when the positional relationship between the main body and the assistant body satisfies the preset condition.

Optionally, a first instruction to which the electronic apparatus is able to respond in the first status is different from a second instruction to which the electronic apparatus is able to respond in the second status.

Optionally, a first display content of the display unit of the electronic apparatus in the first status is different from a second display content of the display unit of the electronic apparatus in the second status Optionally, a first resource occupied by the electronic apparatus in the first status is different from a second source occupied by the electronic apparatus in the second status.

Optionally, when the positional relationship between the main body and the assistant body satisfies different preset conditions, the corresponding second status is different.

Optionally, the working status is specifically: an application scene mode, and the first status and the second status are specifically: a first application scene mode and a second application scene mode; or The working status is specifically: a system status, and the first status and the second status are specifically: a first system status and a second system status, wherein the first system status is a normal operating status, and the second system status is a non-working status; or The working status is specifically: invoking an application, and the first status and the second status are specifically: invoking a first application and invoking a second application; wherein the first application is different from the second application; or The working status is specifically the collection of the operating system and hardware, the first status is a complete set of the collection of the first operation system and hardware, and the second status is a part of the collection of the second operation system and hardware.

Optionally, when the working status is specifically invoking an application, before switching the working status of the electronic apparatus from a first status to a second status which is different from the first status by the status switching device, it specifically includes: obtaining the current system status of the electronic apparatus; deciding whether the current system status is in the normal operating status or the non-working status; switching the current system status to the normal operating status when the current system status is in the non-working status; and invoking the second application.

Optionally, the assistant body is detachably connected to the main body by the connecting device.

Optionally, detecting whether the positional relationship between the main body and the assistant body satisfies the preset condition is specifically: detecting whether the assistant body being connected to the main body or the assistant body being separated from the main body, and the positional relationship satisfies the preset condition when the assistant body is connected to the main body; or the positional relationship satisfies the preset condition when the assistant body is separated from the main body.

Optionally, when the number of the assistant body is greater than or equal to 2, the first status and the second status corresponding to each assistant body are different from each other.

Optionally, the assistant body is rotatable connected to the main body by the connecting device, and the assistant body includes an operational region for operating a display interface of the display unit of the electronic apparatus, when the assistant body is in a second relative position with respect to the main body, in comparison to when the assistant body is in a first relative position with respect to the main body, a first operation body at the bottom of the electronic apparatus is more suitable for the user to hold to carry out an input operation to the operational region; and the method further includes: receiving a first input operation through the operational region; generating a first control instruction based on the first input operation; and executing the first control instruction to operate the display interface.

Yet another aspect of the embodiments of the present invention provides a control method applied in an electronic apparatus including a main body, a connecting device and an assistant body, the assistant body is rotatable connected to the main body by the connecting device, and the assistant body includes an operational region, the method includes: receiving a first input operation through the operational region; generating a first control instruction based on the first input operation; and executing the first control instruction to operate a display interface of display unit of the electronic apparatus, wherein when the assistant body is in a second relative position with respect to the main body, in comparison to when the assistant body is in a first relative position with respect to the main body, a first operation body at the bottom of the electronic apparatus is more suitable for the user to hold to carry out an input operation to the operational region.

Optionally, the assistant body includes a micro-control unit, and generating the first control instruction based on the first input operation is specifically: processing the first input operation as the first control instruction by the micro-control unit.

Optionally, the method further includes: detecting whether the positional relationship between the main body and the assistant body satisfies the preset condition; and switching the working status of the electronic apparatus from a first status to a second status which is different from the first status when the positional relationship between the main body and the assistant body satisfies the preset condition.

Optionally, the method further includes: switching an instruction set to which the operational region is able to respond from a first instruction set in the first status to a second instruction set in the second status, wherein the first instruction set is not completely the same as the second instruction set.

The one or more technical solutions provided in the above embodiments of the present invention at least have the following technical effects or advantages:

In the embodiments of the present invention, the electronic apparatus includes a main body provided with a display unit and an assistant body, the assistant body is connected to the main body by a connecting device, and the electronic apparatus further includes a status switching device for switching working status of the electronic apparatus from a first status to a second status which is different from the first status when positional relationship between the main body and the assistant body satisfies a preset condition. Therefore, since the assistant body can change position with respect to the main body so as to change the positional relationship between the main body and the assistant body in this embodiment, the status of the electronic apparatus can be switched by changing the positional relationship to make the positional relationship satisfy the preset condition. That is, the current status of the electronic apparatus can be changed by changing the positional relationship between the assistant body and the main body, so the user can change the status of the electronic apparatus by changing the position of the assistant body with respect to the main body directly, without completing switch of the status by multiple times of man-machine interaction, so this method is easy to use and it increases operational efficiency.

Further, in the embodiments of the present invention, the assistant body has an operational region thereon, the operational region is for operating a display interface of the display unit, and when the assistant body is in a second relative position with respect to the main body, in comparison to when the assistant body is in a first relative position with respect to the main body, the first operational body at the bottom of the electronic apparatus is more suitable for the user to hold to carry out an input operation to the operational region. Since in this embodiment, the assistant body can rotate with respect to the main body, the plane at which the operational region of the assistant body is may not be parallel to the plane at which the display unit is, and the angle between the operational region and the display unit can be adjusted, so that the operation of the user on the operational region of the assistant body is very comfortable. As compared with that the operational region and the display unit are in the same plane in the prior arts, the electronic apparatus in the present embodiment is more compliant with human engineering to facilitate the user to use.

It is to be understood that both of the previous general description and the following detailed description are schematic, and intend to provide a further explanation of the technology sought for protection.

DETAILED DESCRIPTION

The respective preferable embodiments of the present invention are described with reference to the accompanying drawings. The description with reference to the accompanying drawings is provided hereinafter to help to understand the exemplified embodiments of the present invention defined by the claims or the equivalents. It comprises various kinds of specific details helping understanding, and they are only regarded as schematically. Therefore, those skilled in the art would recognize that the embodiments described here can be made various kinds of alternation and modification without departing from the scope and spirit of the present invention. Further, in order to make the specification more clear and brief, the detailed description on the well-known function and structure in the art would be omitted.

Here, it is noted that the same reference numbers are given to constituent parts with substantially same or similar structure and function, and the repetitive descriptions thereof are omitted.

The embodiments of the present invention provide an electronic apparatus and a control method for solving the problem of low operational efficiency caused by the tedious procedure of the inconvenient switch of status in the prior arts.

The overall concept of the technical solution in the embodiments of the present invention for solving the above technical problem is as follows:

The electronic apparatus includes a main body provided with a display unit and an assistant body, the assistant body is rotatable connected to the main body by a connecting device, and the electronic apparatus further includes a status switching device for switching working status of the electronic apparatus from a first status to a second status which is different from the first status when positional relationship between the main body and the assistant body satisfies a preset condition. Therefore, since the assistant body can change position with respect to the main body so as to change the positional relationship between the main body and the assistant body in this embodiment, the status of the electronic apparatus can be switched by changing the positional relationship to make the positional relationship satisfy the preset condition. That is, the current status of the electronic apparatus can be changed by changing the positional relationship between the assistant body and the main body, so the user can change the status of the electronic apparatus by changing the position of the assistant body with respect to the main body directly, without completing switch of the status by multiple times of man-machine interaction, so this method is easy to use and it increases operational efficiency.

For understanding the above-described technical solution better, the above-described technical solution is explained in detail in combination with the accompanying drawings of the specification and the specific implementation modes.

Figure 1:
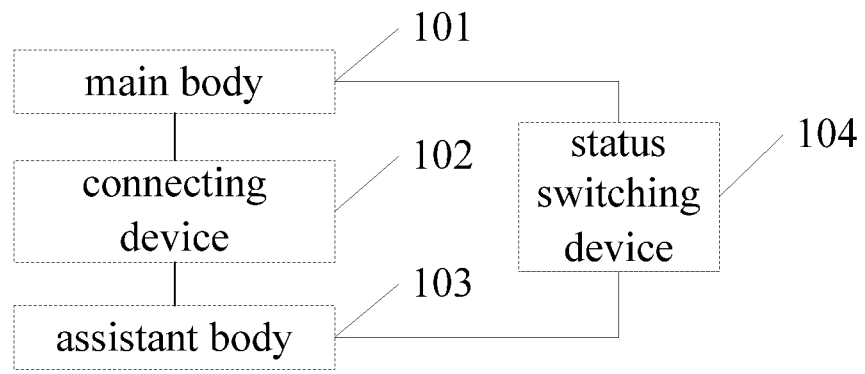
FIG. 1 is a functional block diagram of the electronic apparatus of the first embodiment of the present invention.
Figure 2:
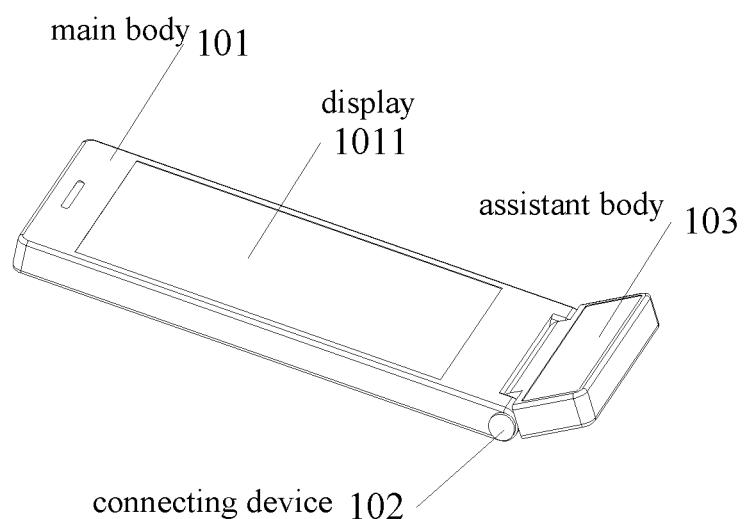
FIG. 2 is a structural diagram of the electronic apparatus of the first embodiment of the present invention.

The first embodiment of the present invention provides an electronic apparatus. With reference to FIG. 1 and FIG. 2, FIG. 1 is a functional block diagram of the electronic apparatus of the present embodiment and FIG. 2 is a structural diagram of the electronic apparatus of the present embodiment.

As shown in FIG. 1 and FIG. 2, the electronic apparatus includes: a main body 101 provided with a display unit 1011 positioned at a first surface of the main body 101; an assistant body 103; a connecting device 102 for connecting the main body 101 and the assistant body 103; a status switching device 104 for switching working status of the electronic apparatus from a first status to a second status which is different from the first status when positional relationship between the main body 101 and the assistant body 103 satisfies a preset condition.

Wherein the status switching device 104 may be positioned in the main body 101, or may be positioned in the assistant body 103.

In a specific implementation mode, the assistant body 103 can be rotatable connected to the main body 101 by the connecting device, for example, the connecting device 102 is specifically a hinge structure or other rotatable structure. And further, the connecting device 102 can support rotation in a plurality of angles and can be kept in the plurality of angles.

In another specific implementation mode, the assistant body 103 is detachable connected to the main body 101 by the connecting device 102. For example, the connecting device 102 is specifically structure of snap and slot which are provided on the assistant body 103 and the main body 101 respectively. Of course, in practical applications, the connecting device 102 may also be other detachable structure.

In yet another specific implementation mode, the assistant body 103 has an attachable and detachable connection to the main body 101 by the connecting device 102, that is, the assistant body 103 can be separated from the main body 101, and can rotate with respect to the main body 101 when the assistant body 103 is connected to the main body 101.

In the above three kinds of specific implementation mode, the specific structure of the connecting device 102 is well-known for those skilled in the art, and those skilled in the art can select any connection structure according to actual requirement, so it is no longer described here.

Figure 3:
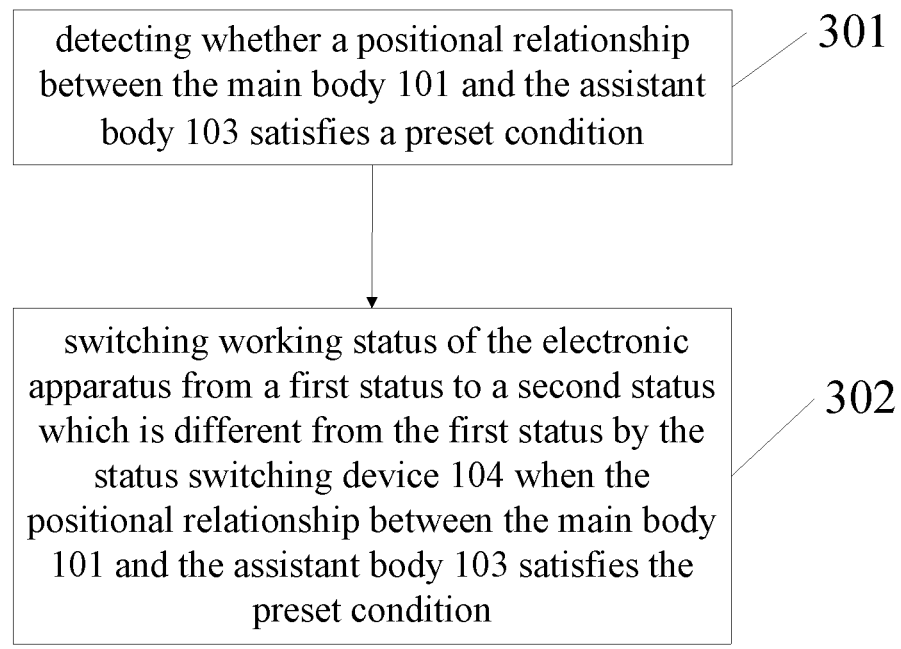
FIG. 3 is a flow chart of the control method of the first embodiment of the present invention.

With reference to FIG. 3 next, FIG. 3 is a flow chart of the control method of the first embodiment of the present invention, the method is for example applied in the electronic apparatus in FIG. 1.

As shown in FIG. 3, the method includes:

Step 301: detecting whether a positional relationship between the main body 101 and the assistant body 103 satisfies a preset condition;

Step 302: switching the working status of the electronic apparatus from a first status to a second status which is different from the first status by the status switching device 104 when the positional relationship between the main body 101 and the assistant body 103 satisfies the preset condition.

Firstly, according to difference of the working status of the electronic apparatus, in the specific implementation procedure, step 302 has a plurality of different implementation forms, and they are explained by example as follows.

In a first implementation form, the working status is specifically an application scene mode, and the first status and the second status are specifically a first application scene mode and a second application scene mode. Then, step 302 is specifically: switching the working status of the electronic apparatus from a first application scene mode to a second application scene mode different from the first application scene mode by the status switching device 104.

In particular, for example, the first application scene mode is specifically a webpage working mode, that is, in the first application scene mode, applications related to webpage (for example, browser, sina micro-blog, renren network) are collected and displayed on a highlighted position on the display unit 1011 to facilitate the user's operation. In the first application scene mode, the user can find a webpage application that he wants to use conveniently, so the efficiency of the operation of the user is improved.

When the positional relationship between the main body 101 and the assistant body 103 satisfies the preset condition, step 302 is executed, and the electronic apparatus is switched to the second application scene mode, here, for example, the second application scene mode is specifically a video working mode. That is, in the second application scene mode, applications related to video (for example, a video player, a network TV, a webpage video) are collected and displayed on the highlighted position on the display unit 1011 instead of the webpage applications in the first application scene mode, to facilitate the user's operation. In the second application scene mode, the user can find the video application that he wants to use conveniently, so the efficiency of the operation of the user is improved.

Therefore, a first instruction that can be responded in the first status is different from a second instruction that can be responded in the second status, and a first display content displayed on the display unit 1011 of the electronic apparatus in the first status is different from the second display content displayed on the display unit 1011 in the second status.

In a second implementation form, the working status is a system status, and the first status and second status are specifically a first system status and a second system status. For example, the first system status is a normal operating status, and the second system status is a non-working status, of course, and vice versa. Wherein the non-working status may be specifically a low power consumption status, for example, a sleep status, a power-off status, and a standby status. Then, step 302 is specifically: switching the working status of the electronic apparatus from the first system status to the second system status different from the first system status by the status switching device 104.

In particular, when the electronic apparatus is in the normal operating status, the user can carry out various operations thereto, for example, starting up the applications installed on the electronic apparatus, setting system parameters, receiving and sending short messages, dialing phone calls. And when the working status of the electronic apparatus is switched to the non-working status, for example the standby status in step 302, the display unit 1011 is not lighted, and the instruction that can be responded is generally only lightening the screen, receiving an incoming call or a message, or displaying an unlocked interface without being able to send a short message or starting up an application.

Therefore, the first display content displayed on the display unit 1011 of the electronic apparatus in the first status is different from the second display content displayed on the display unit 1011 in the second status, and the first instruction that can be responded in the first status is different from the second instruction that can be responded in the second status. Optionally, a first resource occupied by the electronic apparatus in the first status is different from a second source occupied by the electronic apparatus in the second status.

In a third implementation form, the working status is specifically invoking an application, and the first status and the second status are specifically: invoking a first application and invoking a second application, here, the first application is different from the second application. Then, step 302 is specifically: switching the working status of the electronic apparatus from invoking the first application to invoking the second application that is different from the first application by the status switching device 104.

In particular, for example, the first application is specifically sina micro-blog. In the first status, the electronic apparatus invokes the sina micro-blog to open the micro-blog, and the user browses content on the micro-blog. However, if the user wants to turn on PPS network TV at this time, he can make the positional relationship between the assistant body 103 and the main body 101 to satisfy the preset condition by changing the positional relationship between the assistant body 103 and the main body 101, so the step 302 is executed in which the electronic apparatus invokes the PPS network TV. In this case, the sina micro-blog can be or can be not closed.

Therefore, a first instruction that can be responded in the first status is different from a second instruction that can be responded in the second status, and a first display content displayed on the display unit 1011 of the electronic apparatus in the first status is different from the second display content displayed on the display unit 1011 in the second status.

Further, in the first status, one of the resources occupied by the electronic apparatus is the display unit 1011, and in the second status, the resource occupied by the electronic apparatus includes not only the display unit 1011, but also the speaker, the video decoder or the like. It is obvious that, the first resource occupied by the electronic apparatus in the first status is different from the second source occupied by the electronic apparatus in the second status.

In a fourth implementation form, the working status is specifically a collection of the operating system and hardware. The first status is a status of complete set of the collection of the first operation system and hardware, and the second status is a status of a part of the collection of the second operation system and hardware, of course, and vice versa. Then, the step 302 is specifically: switching the working status of the electronic apparatus from the status of complete set combining the first operation system and hardware to the status of a part of the collection of the second operating system and hardware which is different from the first status by the status switching device 104.

In particular, for example, the electronic apparatus is a mobile phone, then in the first status, a complete set of the collection of the first operation system and hardware is included. The first operation system is for example a smart operating system such as IOS, Android or Windows phone, the mobile phone behaves as a smart phone, which is able to use a wireless communication module such as WIFI, 3G, Blue-tooth or the like. The electronic apparatus further includes an AP application processor which is able to start up and execute applications installed on the electronic apparatus, for example, QQ, browser.

And in the second status, a status of a part of the collection of the second operating system and hardware is included, and the second operating system is a simple version of the first operation system. For example, the second operating system is a data platform (for example, Java software platform) supporting a plurality of data platforms in the first operation system, and the application processor is disabled at the same time to only let the CP wireless communication processor to work. That is, in the second status, it can only dial phone call and receive and send short message (SMS) normally, the applications can't be opened, so the smart functions are shielded, and, the wireless communication module, for example, WIFI, 3G, Blue-tooth or the like can be further disabled. At the same time, in the second status, power consumption of the electronic apparatus is less than the power consumption in the first status, correspondingly, in the second status; the function of the electronic apparatus is weaker than the functions in the first status.

Therefore, in the first status, various kinds of application icons can be displayed on the display unit 1011, and in the second status, only interfaces related to phone call and short message are displayed on the display unit 1011. At the same time, in the first status, the instructions that can be responded by the electronic apparatus in the first status are much more than the instructions that can be responded in the second status. Further, it is obvious that in this embodiment, the resource occupied in the first status is different from the resource occupied in the second status.

The difference exhibited by the electronic apparatus in the first status and the second status is described from another perspective as follows, and in the specific implementation procedure, there can be various kinds of implementation forms, and they are explained by example as follows.

In a fourth implementation form, the first instruction to which the electronic apparatus is able to respond in the first status is different from the second instruction to which the electronic apparatus is able to respond in the second status.

In particular, for example, they are examples described in the above first implementation form to the fourth implementation form, and are no longer described here.

In a fifth implementation form, the first display content of the display unit of the electronic apparatus in the first status is different from the second display content of the display unit of the electronic apparatus in the second status.

In particular, for example, they are examples described in the above first implementation form to the fourth implementation form, and are no longer described here.

In a sixth implementation form, the first resource occupied by the electronic apparatus in the first status is different from the second source occupied by the electronic apparatus in the second status.

In particular, for example, they are examples described in the above second implementation form to the fourth implementation form, and are no longer described here.

In a further specific implementation mode, when the working status is specifically invoking an application, the step 302 specifically includes: obtaining a current system status of the electronic apparatus; deciding whether the current system status is in the normal operating status or the non-working status; and switching the current system status to the normal operating status by the status switching device 104 when the current system status is in the non-working status; and invoking the second application.

In particular, for example, the current system status is the non-working status, for example a screen locked status, and there is an incoming call at this time. Then, the user can change the positional relationship between the assistant body 103 and the main body 101, and the positional relationship is decided in step 301, until the positional relationship between the assistant body 103 and the main body 101 satisfies the preset condition. Then, since the current system status is the screen locked status, the status switching device 104 switches the current system status to the normal operating status, i.e., the unlocked status firstly, and invokes a calling application to establish a talking connection directly.

And when the current system status is the normal operating status, the second application is invoked directly.

Wherein the electronic apparatus further specifically includes a processing unit for obtaining the current system status of the electronic apparatus and deciding whether the current system status is in the normal operating status or the non-working status. The processing unit may be the same element as the status switching device 104, and they may be independent elements to each other.

Next, the specific implementation form of step 301 is described in detail. In step 301, whether the positional relationship between the main body 101 and the assistant body 103 satisfies the preset condition is detected, and in the specific implementation procedure, there may be various kinds of implementation forms which are explained in detail as follows.

There may be three kinds of cases according to difference of connection relationship between the assistant body 103 and the main body 101. As described above, the first kind is a rotatable connection between the assistant body 103 and the main body 101, the second kind is a detachable connection between the assistant body 103 and the main body 101, and the third kind is a detachable and rotatable connection between the assistant body 103 and the main body 101.

Here, in the first case, there are also different implementation forms, and they are described by example as follows.

In the first implementation form, the step 301 is specifically: detecting an angle between the assistant body 103 and the display unit 1011, which is specifically detecting by an angle detecting device or other devices that can detect an angle, and then deciding whether the angle is changed from a first angular range to a second angular range; and if the angle is changed from the first angular range to the second angular range, it represents that the positional relationship between the main body 101 and the assistant body 103 satisfies the preset condition. Here, it is assumed that the first angular range is 90 degrees to 120 degrees, the second angular range is 121 degrees to 180 degrees, and the third angular range is 181 degrees to 270 degrees, and the angle between the assistant body 103 and the display unit 1011 is in the first angular range currently, for example, the status as shown in FIG. 2, and it is assumed that the first status is the above webpage working mode at this time.

Then, when the angle between the assistant body 103 and the display unit 1011 being changed from the first angular range to the second angular range, that is, being in the range from 121 degrees to 180 degrees is decided in step 301, the second status can be determined as the above video working mode at this time, and then step 302 is executed.

Similarly, when the angle between the assistant body 103 and the display unit 1011 being changed from the second angular range to a third angular range is detected in the step 301, which represents that the positional relationship between the main body 101 and the assistant body satisfies the preset condition, then the status switching device 104 switches the working status of the electronic apparatus from the second status to a third status which is different from the second status. Here, the second status is the first status in step 302, and the third status is the second status in step 302. Continue to use the above example, it is assumed that the third status is an official mode, that is, in the third status, applications related to official work (for example, Word, E-mail, Excel) are collected and displayed on highlighted positions of the display unit 1011 instead of the video applications in the second status, to facilitate the user's operation. In the third status, the user can find the official work applications that he wants to use conveniently, so the efficiency of the operation of the user is improved.

In the above examples, in different status, the corresponding applications are totally different, but in practical applications, the same applications can be provided in different status with a different layout, that is, some of the applications are in highlighted position, and some of them are in un-highlighted position.

The implementation procedure of the control method of the first embodiment of the present invention is explained by example above, and in practical applications, other preset conditions can be set according to practical situation, and the first status and the second status can be set according to actual requirement, for example, the above first system status and second system status, invoking the first application and invoking the second application, and so on. Further, the electronic apparatus provides a setting interface, and user can set these conditions and status by the setting interface, so as to be more compliant with the user's requirement.

The second implementation form is similar to the first implementation form, only the preset condition is not the angular range but a certain concrete angle value, for example, the angle between the assistant body 103 and the main body 101 is 180 degrees, that is, the assistant body 103 and the main body 101 form a status of straight type. At this time, it also represents that the positional relationship between the assistant body 103 and the main body 101 satisfies the preset condition, then the second status can be determined as the non-working status, for example, the screen locked status; and, if the angle between the assistant body 103 and the main body 101 is 120 degrees, then the second status can be determined as the normal operating status.

In another specific implementation mode, for example, the angle between the assistant body 103 and the main body 101 is 120 degrees, then it represents that the angle satisfies the preset condition, and then the second working status can be determined as status of a part of the collection of the second operating system and hardware at this time, for example, it can only dial a phone call and receive and send a short message. And, if the angle between the assistant body 103 and the main body 101 is 180 degrees, it represents that the angle satisfies the preset condition, and the second working status can be determined as status of the complete set of the collection of the first operation system and hardware at this time, that is, it is a smart phone.

Wherein in the second kind of case, the positional relationship between the main body 101 and the assistant body 103 satisfying the preset condition is specifically: the assistant body 103 being connected to the main body 101 or the assistant body 103 being separated from the main body 101.

In particular, for example, the first status of the electronic apparatus is the non-working status, for example, the power-off status, and when the assistant body 103 is connected to the main body 101, it represents that the preset condition is satisfied, and then the second status can be determined as for example the normal operating status, that is, the assistant body 103 similarly has a function of starting up.

And, for example, when the first working status of the electronic apparatus is the normal operating status, when the assistant body 103 is separated from the main body 101, then the preset condition is satisfied, and the second status can be determined as the non-working status, for example, the power-off status at this time. That is, when the assistant body 103 is connected to the main body 101, the electronic apparatus is in the normal operating status, and when the assistant body 103 is separated from the main body 101, the electronic apparatus is power-off or standby.

Further, the assistant body 103 may be plural, for example, the number thereof is greater than or equal to 2. Each assistant body 103 corresponds to a different status, that is, the first status and the second status corresponding to each assistant body are different from each other.

Then, step 301 is specifically: detecting that the assistant body 103 connected to the main body 101 is specifically which of the plurality of assistant bodies 103, and when it is determined as one among them, since the assistant body of other electronic apparatus may be connected, so if it is one of the plurality of assistant bodies, it represents that the preset condition is satisfied. And then the step 302 is executed, that is, the working status of the electronic apparatus is switched from the first status to the second status corresponding to the assistant body connected to the main body 101 currently. Wherein the respective status is for example status described in the first implementation form, for example, the first status is the webpage mode, the second status is the video mode and the third status is the official work mode. Then, in this embodiment, if the working status of the electronic apparatus is wished to switch, it only needs to connect different corresponding assistant bodies 103 to the main body 101.

Or, different assistant bodies correspond to different applications, for example, a first assistant body corresponds to the PPS network TV, however, if the assistant body 103 connected at this time is the second one, the corresponding application is a storm AV video player. Then, when the first assistant body is connected, the PPS network TV is invoked, and if the second assistant body is connected, the storm AV video player is invoked.

In the third kind of case, the first kind of case and the second kind of case can be combined, for example, which assistant body 103 is connected to the main body 101 is decided firstly. It is assumed that it is the first assistant body, then it represents that the preset condition is satisfied, and the corresponding second status is the above video mode. Continue to use the above examples in the first implementation form and the second implementation form in the first kind of case to describe, the angle between the assistant body 103 and the main body 101 is in which angular range or is specifically which angle value is detected next, and then which application is invoked is determined according to the angular range or the angle value. For example, when the angle between the assistant body 103 and the display unit 1011 is specifically 130 degrees, then the second application to be invoked correspondingly at this time is the PPS network TV; and if the angle is specifically 150 degrees, then the storm AV video player is invoked. Further, in practical applications, the user can set which angle corresponding to which application by himself.

Further, according to difference of the assistant body 103, the corresponding applications are different from each other. For example, continue to use the above-described example, even if the angle value of the angle are 130 degrees, but the first assistant body may corresponds to the PPS network TV, however, if the assistant body 103 connected is the second one at this time, then when the angle is 130 degrees, the corresponding application may be the storm AV video player.

With the detailed description of the step 301 above, it is known that the preset condition may be slightly different in practical applications, and accordingly, the corresponding second status as satisfying different preset conditions may be different from each other.

Figure 4:
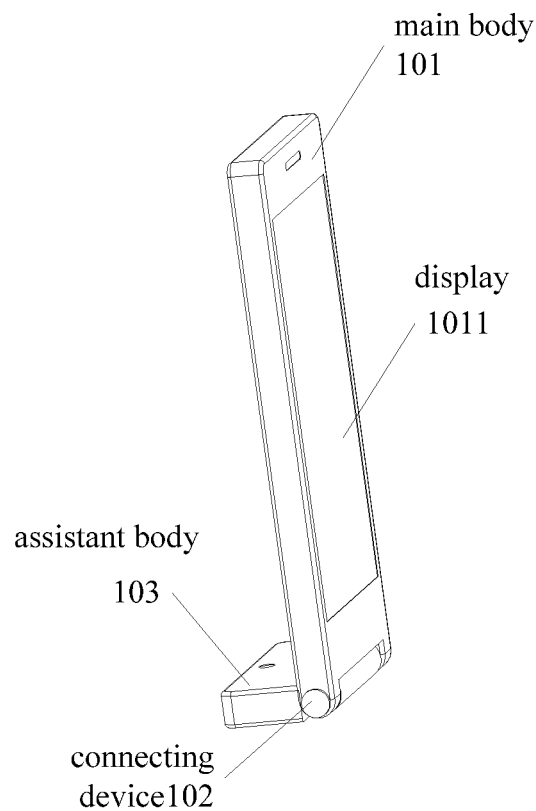
FIG. 4 is a schematic diagram of the form of the electronic apparatus in the first embodiment of the present invention.

In a further embodiment, as shown in FIG. 4, when the assistant body 103 rotates away from the direction of the display unit 1011 to about 270 degrees, for example, 260 degrees, 280 degrees, 290 degrees, then the assistant body 103 can support the main body as a supporting member, which implements upright placement of the electronic apparatus, so the electronic apparatus can implement upright placement without any additional supporting member.

Figure 5:
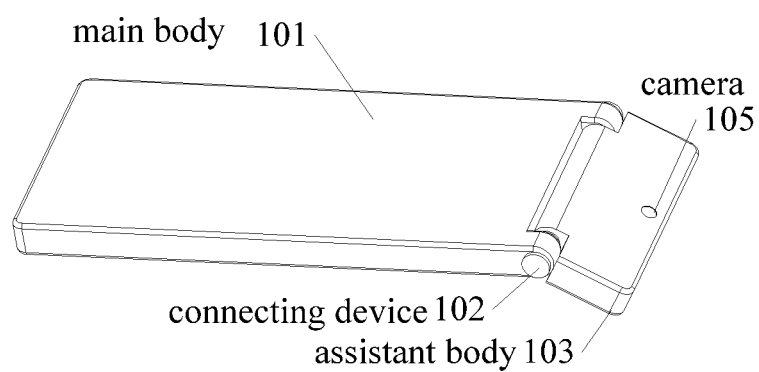
FIG. 5 is a structural diagram of the electronic apparatus in the second embodiment of the present invention.

Still further, as shown in FIG. 5, a camera head is further included on the assistant body 103, since the assistant body 103 can rotate, so the camera head 105 can rotate along therewith, thus, the electronic apparatus in the present embodiment can adjust a shooting angle of the camera head 105 so as to implement shooting of different scenes unlike the prior arts in which the camera head cannot adjust the shooting angle.

Further, the assistant body 103 may also includes a speaker, an operational region thereon, here, the operational region is for operating a display interface of the display unit 1011 of the electronic apparatus. When the assistant body 103 is in a second relative position with respect to the main body 101, as compared to when the assistant body 103 is in a first relative position with respect to the main body 101, a first operation body at the bottom of the electronic apparatus is more suitable for the user to hold to carry out an input operation to the operational region. For example, as shown in FIG. 2, such a relative position is more suitable for the user to hold the electronic apparatus with one hand and carry out an input operation with one hand than the angle between the assistant body 103 and the display unit 1011 is 180 degrees, and it much more suitable to hold the electronic apparatus and carry out an input operation with one hand than the relative position as shown in FIG. 4.

In the specific implementation procedure, the method in FIG. 3 further includes: receiving a first input operation through the operational region; generating a first control instruction based on the first input operation; and executing the first control instruction to operate the display interface. In particular, for example, user holds the electronic apparatus with the left hand and the user slides rightwards on the operational region with his thumb. Then, the electronic apparatus receives the first input operation through the operational region, and generates the first control instruction for example an instruction for turning page rightwards according to correspondence relationship between the operation and the instruction. Then the instruction is executed to turn page rightwards on the display interface of the display unit 1011.

Figure 6:
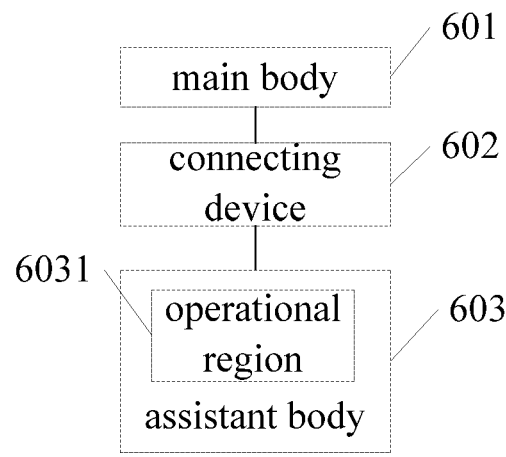
FIG. 6 is a functional block diagram of the electronic apparatus in the third embodiment of the present invention.

In the third embodiment of this application, there further provides an electronic apparatus as shown in FIG. 6 which including: a main body 601 provided with a display unit positioned at a first surface of the main body 601; a connecting device 602; an assistant body 603 which is rotatable connected to the main body 601 by the connecting device 602 and includes an operational region 6031 which is for operating a display interface of the display unit; when the assistant body 603 is in a second relative position with respect to the main body 601, in comparison to when the assistant body 603 is in a first relative position with respect to the main body 601, a first operational body at the bottom of the electronic apparatus is more suitable for the user to hold to carry out an input operation to the operational region.

Figure 7:
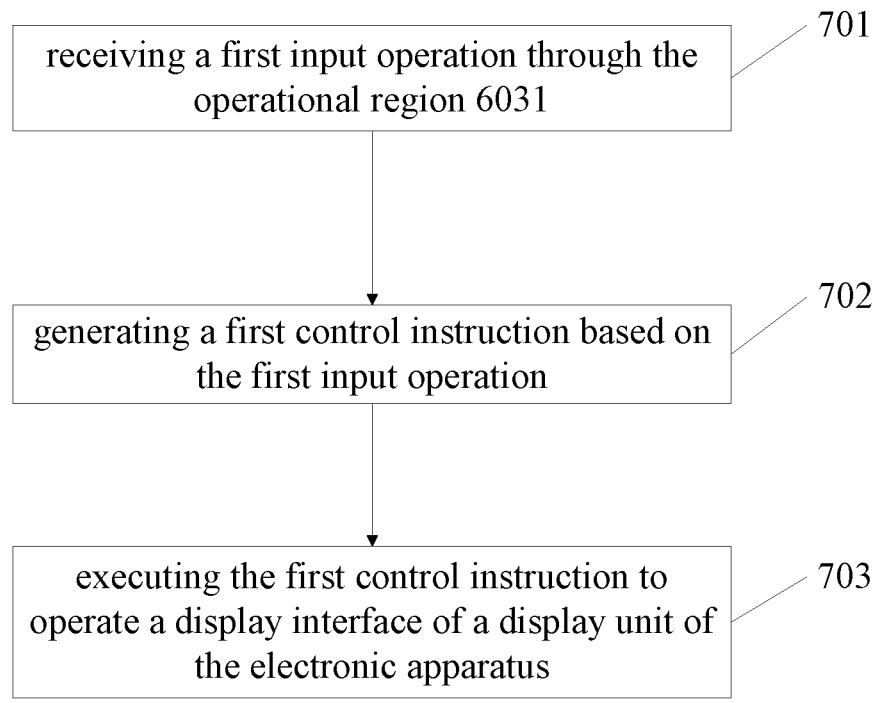
FIG. 7 is a flow chart of the control method in the third embodiment of the present invention.

With reference to FIG. 7 next, FIG. 7 is a flow chart of the control method of the third embodiment of the present invention, the method is for example applied in the electronic apparatus in FIG. 6.

As shown in FIG. 7, the method includes:

Step 701: receiving the first input operation through the operational region 6031;

Step 702: generating the first control instruction based on the first input operation;

Step 703: executing the first control instruction to operate a display interface of the display unit of the electronic apparatus.

Here, the detailed implementation procedure of the method is similar to that in the above embodiment, so it is no longer described here.

Further, the electronic apparatus includes a processing unit positioned on the main body 601, and the assistant body includes a micro-control unit for processing the input operation collected by the operational region as an instruction and feeding the instruction back to the processing unit. In particular, for example, the micro-control unit processes the first input operation as a first control instruction and feeds the first control instruction back to the processing unit of the electronic apparatus.

The electronic apparatus in the present embodiment can be implemented in combination with the electronic apparatus in FIG. 1 and other respective embodiments, and the control method in FIG. 7 can be implemented in combination with the control method in FIG. 3. In particular, for example, the electronic apparatus further includes a status switching device for switching the working status of the electronic apparatus from a first status to a second status which is different from the first status when the positional relationship between the main body 601 and the assistant body 603 satisfies the preset condition. Further, the specific implementation steps of the control method corresponding to the electronic apparatus in the present embodiment is similar to the control method in FIG. 3, so it is no longer described here.

Further, the electronic apparatus further includes an instruction switching device for switching an instruction set to which the operational region 6031 is able to respond from a first instruction set in the first status to a second instruction set in the second status, wherein the first instruction set is not completely the same as the second instruction set. Wherein the instruction switching device can be positioned in the assistant body 603, and can be positioned in the main body 601.

In particular, for example, the switch of the instructions is carried out at the same time of the status switching, or after the status switching.

The electronic apparatus and the control method in the present embodiment are explained by a specific example as follows. Continue to use the above-described example, for example, the first status is the webpage mode, then the first instruction set corresponds to for example instruction of returning, advancing or closing; and for example, the second status is the video mode, then the second instruction set corresponds to instructions such as fast forward, fast rewind, previous, next, pause, close, full screen, exiting full screen. Then in the first status, the first instruction set is used to match, and if in the second status, the second instruction set is used to match. Thus, on one hand, the same input operation can correspond to different instructions in different status. For example, for the same sliding rightwards, in the first status, the corresponding first control instruction is for example returning, and in the second status, it is for example fast forward, thus, diversity of the instruction can be increased. On the other hand, match is carried out only in the corresponding instruction set, and is not carried out in all of the instruction sets, then the amount of calculation of the match decreases, and the velocity of the match is increased.

In the above respective embodiments, the electronic apparatus may be a smart phone, a PDA, and may be a tablet computer, or other electronic apparatus that can be held by hand to use.

One or more technical solutions provided by the embodiments of the present invention at least have the following technical effects or advantages:

In one embodiment of the present invention, the electronic apparatus includes a main body provided with a display unit thereon and an assistant body, the assistant body is rotatable connected to the main body by a connecting device, and the electronic apparatus further includes a status switching device for switching working status of the electronic apparatus from a first status to a second status which is different from the first status when positional relationship between the main body and the assistant body satisfies a preset condition. Therefore, since the assistant body can change position with respect to the main body so as to change the positional relationship between the main body and the assistant body in this embodiment, the status of the electronic apparatus can be switched by changing the positional relationship to make the positional relationship satisfy the preset condition. That is, the current status of the electronic apparatus can be changed by changing the positional relationship between the assistant body and the main body, so the user can change the status of the electronic apparatus by changing the position of the assistant body with respect to the main body directly, without completing switch of the status by multiple times of man-machine interaction, so this method is easy to use and it increases operational efficiency.

Further, in another embodiment of the present invention, the assistant body has an operational region thereon, the operational region is for operating a display interface of the display unit, and when the assistant body is in a second relative position with respect to the main body, in comparison to when the assistant body is in a first relative position with respect to the main body, the first operational body at the bottom of the electronic apparatus is more suitable for the user to hold to carry out an input operation to the operational region. Since in this embodiment, the assistant body can rotate with respect to the main body, the plane at which the operational region of the assistant body is may not be parallel to the plane at which the display unit is, and the angle between the operational region and the display unit can be adjusted, so that the operation of the user on the operational region of the assistant body is very comfortable. As compared with that the operational region and the display unit are in the same plane in the prior arts, the electronic apparatus in the present embodiment is more compliant with human engineering to facilitate the user to use.

As explained in the above, with the development of electronic technology, more and more electronic apparatus such as mobile phone come into human's life, bring convenience to human's life and work, which helps people contact with each other at any time and everywhere.

However, in a mobile phone, a tablet computer even a notebook computer, the display interface only relies on a built-in liquid crystal display, the size thereof is limited by the size of the mobile phone, the tablet computer or the notebook computer itself, so it is inconvenient for the user to use. And, when the user wants to share the content on the electronic apparatus with other users to be viewed, it needs other users to be around the display of the electronic apparatus to view, so it is more inconvenient.

In the prior arts, in order to solve the above problem, the content in the electronic apparatus is projected to a carrying surface by using a projecting unit, thus, the user can view and operate on a larger display interface.

However, the inventor found in the procedure of implementing the technical solution of the embodiments of the present invention that, in the prior arts, when the mobile phone having function of projection or projector is used, there is only one projecting mode. For example, a surface opposite to the display is placed on a supporting surface to project, so the projection angle and the carrying surface of the projection are limited, so the scene of usage of the projecting unit is limited.

Therefore, another aspect of the embodiments of the present invention provides an electronic apparatus for solving the problem that the projector equipment has only one projecting mode so the mode is single and the projection angle and the carrying surface of the projection are limited in the prior arts.

Another aspect of the embodiments of the present invention provides an electronic apparatus including: a first body; a display unit provided on a first surface of the first body and having a first edge and a second edge which is corresponding to the first edge and parallel to the first edge; a second body; a rotation connecting structure for rotatable connecting the first body and the second body; a projecting unit which is provided in the first body and supports projection in a first mode and projecting in a second mode;

Wherein when the projecting unit projects in the first mode, the first body and the second body have a first relative position, and the content to be projected is projected to a first projection region corresponding to the projecting unit through a projection path passing the second body, and a first display interface corresponding to the content to be projected is formed on a first carrying surface of the first projection region, the first display interface is on a first side corresponding to the first edge of the display unit;

When the projecting unit projects in the second mode, the first body and the second body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

Optionally, the first body further includes a second surface, the second surface intersects the first surface and the second surface is closer to the second edge, when the projecting unit projects in the first mode, the first body stand on a supporting surface through the second surface, the first surface has a first angle which is not zero with the supporting surface, the second carrying surface is specifically the supporting surface.

Optionally, the first body further includes a third surface, the third surface intersects the first surface, and is close to the first edge and opposite to the second surface, the rotation connecting structure is specifically provided on the third surface perpendicularly, so that the second body can rotate with respect to the first body in an axial direction which is perpendicular to the third surface.

Optionally, the third surface has a second angle with the first surface, the second angle is an obtuse angle or an acute angle; the second body has a fourth surface and a fifth surface, the fourth surface corresponds to the third surface, and the fifth surface intersects the fourth surface, the rotation connecting structure is connected to the fourth surface.

Optionally, the fifth surface has a first optical channel thereon, when the fifth surface is opposite to the second surface and the light out direction of the projecting unit is towards the direction of the fifth surface, the projecting unit can project in the first mode, the projecting unit projects the content to be projected on the first carrying surface through the first optical channel.

Optionally, the second body includes a light path changing unit for changing the light path of the projecting unit when the projecting unit projects in the second mode, so that the light path passes a second optical channel on a sixth surface of the second body to project the content to be projected on the second carrying surface, wherein the sixth surface is in the same plane as the first surface or is opposite to the first surface.

Optionally, when the second body rotates 180 degrees in the axial direction through the rotation connecting structure, the fifth surface is in the same plane as the first surface or is opposite to the first surface, the second body includes: a light path changing unit for changing the light path of the projecting unit when the projecting unit projects in the second mode, so that the light path passes the first optical channel to project the content to be projected on the second carrying surface.

Optionally, the provided position of the rotation connecting structure corresponds to the position of the projecting unit, so that the light path of the projecting unit passes the rotation connecting structure to reach the second body.

Optionally, the electronic apparatus further includes: a gesture detecting unit for detecting whether there is a gesture input at the time of projecting in any one mode of the first mode and the second mode or at the time of projecting in the second mode only; a first processing unit provided in the first body and for responding to the gesture input to execute an operation corresponding to the gesture input when there is the gesture input.

Optionally, the first processing unit is specifically for: responding to the gesture input to execute an operation corresponding to the gesture input for the content to be projected.

Optionally, the gesture detecting unit is provided in the first body, and the light path of the gesture detecting unit is same as the projection path of the projecting unit.

Optionally, a first display content displayed on the second display interface is different from the second display content displayed on the display unit, the electronic apparatus further includes: a second processing unit for changing status of the first display content based on a trigger operation, and changing the status of the second display content based on the changed first display content when the change of the status of the first display content reaches a predetermined condition.

The one or more technical solutions provided in the above embodiments of the present invention at least have the following technical effects or advantages:

In the embodiments of the present invention, the electronic apparatus includes: the first body; the display unit provided on the first surface of the first body and having the first edge and the second edge which is corresponding to the first edge and parallel to the first edge; the second body; the rotation connecting structure for rotatable connecting the first body and the second body; the projecting unit which is provided in the first body and supports projecting in the first mode and projecting in the second mode;

Wherein when the projecting unit projects in the first mode, the first body and the second body have the first relative position, and the content to be projected is projected to the first projection region corresponding to the projecting unit through the projection path passing the second body, and the first display interface corresponding to the content to be projected is formed on the first carrying surface of the first projection region, the first display interface is on the first side corresponding to the first edge of the display unit;

When the projecting unit projects in the second mode, the first body and the second body have the second relative position which is different from the first relative position, and the content to be projected is projected to the second projection region corresponding to the projecting unit, and the second display interface corresponding to the content to be projected is formed on the second carrying surface of the second projection region, the second display interface is on the second side corresponding to the second edge of the display unit.

It can be seen that, firstly, the electronic apparatus in the present embodiment has two kinds of projection modes, and in different projection modes, the display interface to which the content to be projected is projected is on different sides of the display unit, so it solves the technical problem that there is only one projection mode in the prior arts so the mode of projection is single and projection angle and projection carrying surface are limited, and achieves the technical effect that one projector equipment has two kinds of projection modes which increases application scene of the projector equipment. Secondly, in this embodiment, with the rotation connecting structure, the first body has two kinds of positional relationship with the second body, and different projection modes are implemented by different positional relationships, so the structure is simple, and it is easy to operate and use.

The electronic apparatus according to the fourth embodiment of the present invention are described with reference to FIG. 8 to FIG. 15 as follows.

The fourth embodiment of the present invention provides an electronic apparatus for solving the problem that the projector equipment has only one projecting mode so the mode is single and the projection angle and the carrying surface of the projection are limited in the prior arts.

The overall concept of the technical solution in the fourth embodiment of the present invention for solving the above technical problem is as follows:

The electronic apparatus includes: a first body; a display unit provided on a first surface of the first body and having a first edge and a second edge which is corresponding to the first edge and parallel to the first edge; a second body; a rotation connecting structure for rotatable connecting the first body and the second body; a projecting unit which is provided in the first body and supports the projection in a first mode and the projecting in a second mode;

Wherein when the projecting unit projects in the first mode, the first body and the second body have a first relative position, and the content to be projected is projected to a first projection region corresponding to the projecting unit through a projection path passing the second body, and a first display interface corresponding to the content to be projected is formed on a first carrying surface of the first projection region, the first display interface is on a first side corresponding to a first edge of the display unit;

When the projecting unit projects in the second mode, the first body and the second body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to a second edge of the display unit.

It can be seen that, firstly, the electronic apparatus in the present embodiment has two kinds of modes of projection, and in different modes of projection, the display interface to which the content to be projected is projected is on different sides of the display unit, so it solves the technical problem that there is only one mode of projection in the prior arts so the mode of projection is single and projection angle and projection carrying surface are limited, and achieves the technical effect that one projector equipment has two kinds of projection modes which increases application scene of the projector equipment. Secondly, in this embodiment, with the rotation connecting structure, the first body has two kinds of positional relationship with the second body, and different projection modes are implemented by different positional relationships, so the structure is simple, and it is easy to operate and use.

Figure 8:
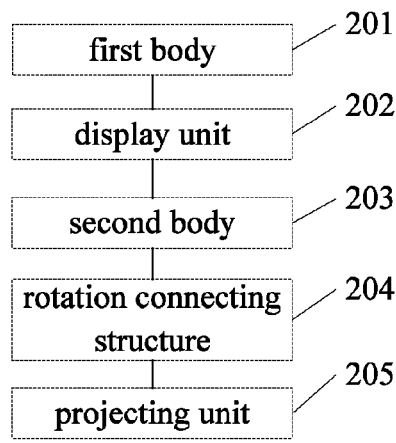
FIG. 8 is a functional block diagram of the electronic apparatus of the fourth embodiment of the present invention.
Figure 9:
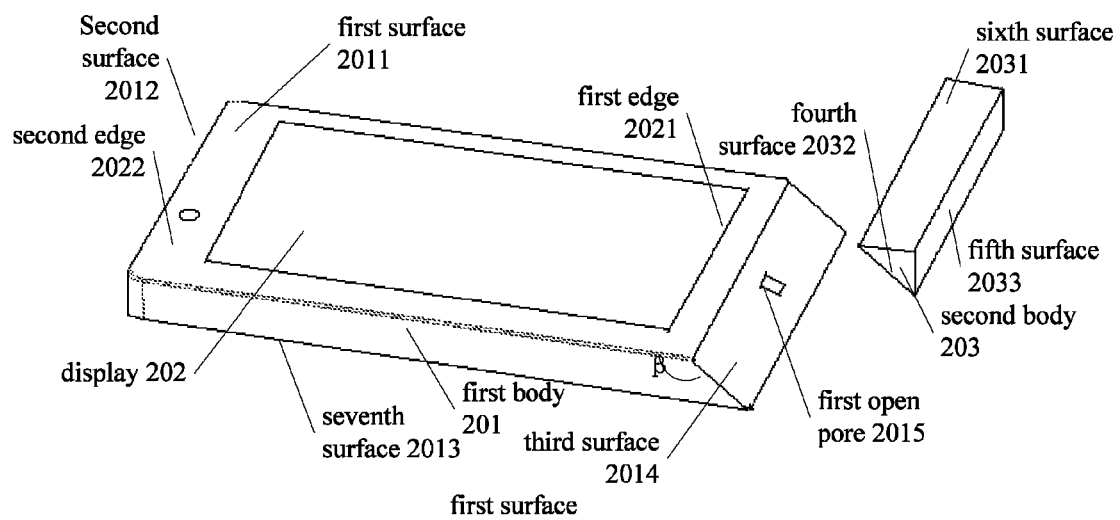
FIG. 9 is a structural diagram of the electronic apparatus of the fourth embodiment of the present invention.

The fourth embodiment of the present invention provides an electronic apparatus. With reference to FIG. 8 and FIG. 9, FIG. 8 is a functional block diagram of the electronic apparatus of the present embodiment and FIG. 9 is a structural diagram of the electronic apparatus of the present embodiment.

As shown in FIG. 8 and FIG. 9, the electronic apparatus includes: a first body 201; a display unit 202 which is provided on a first surface 2011 of the first body 201 and has a first edge 2021 and a second edge 2022 which is corresponding to the first edge 2021 and parallel to the first edge 2021; a second body 203; a rotation connecting structure 204 for rotatable connecting the first body 201 and the second body 203; and a projecting unit 205 which is provided in the first body 201 and supports projection in a first mode and projecting in a second mode;

Wherein when the projecting unit 205 projects in the first mode, the first body 201 and the second body 203 have a first relative position, and the content to be projected is projected to a first projection region corresponding to the projecting unit 205 through a projection path passing the second body 203, and a first display interface corresponding to the content to be projected is formed on a first carrying surface of the first projection region, the first display interface is on a first side corresponding to a first edge 2021 of the display unit 202;

When the projecting unit 205 projects in the second mode, the first body 201 and the second body 203 have a second relative position which is different from the first relative position, and the content to be projected is projected to a second projection region corresponding to the projecting unit 205, and a second display interface corresponding to the content to be projected is formed on a second carrying surface of the second projection region, the second display interface is on a second side corresponding to a second edge 2022 of the display unit 202.

It can be seen that, firstly, the electronic apparatus in the present embodiment has two kinds of modes of projection, and in different modes of projection, the display interfaces to which the content to be projected is projected is on different sides of the display unit, so it solves the technical problem that there is only one mode of projection in the prior arts so the mode of projection is single and projection angle and projection carrying surface are limited, and achieves the technical effect that one projector equipment has two kinds of projection modes which increases application scene of the projector equipment. Secondly, in this embodiment, with the rotation connecting structure, the first body has two kinds of positional relationship with the second body, and different projection modes are implemented by different positional relationships, so the structure is simple, and it is easy to operate and use.

Continue to refer to FIG. 9 which is a schematic diagram of a schematic structure of the electronic apparatus of the present embodiment, as shown in FIG. 9, the first body 201 further has a second surface 2012 which is close to the second edge 2022. The first body 201 further has a seventh surface 2013 and a third surface 2014, the seventh surface 2013 is opposite to the first surface 2011, the second surface 2012 intersects the first surface 2011 and the seventh surface 2013, the third surface 2014 is connected to the first surface 2011 and the seventh surface 2013, and it is opposite to the second surface 2012 and close to the first edge 2021.

The first projection mode and the second projection mode are described in different modes of placement of the electronic apparatus as follows.

Figure 10A:
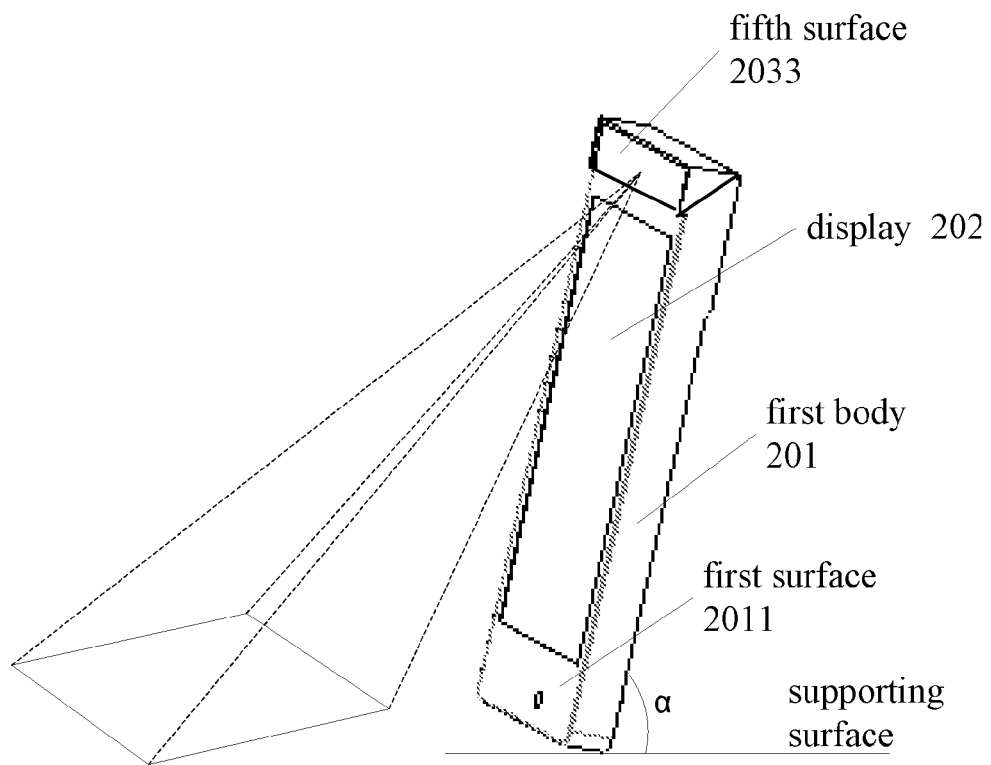
FIG. 10a to FIG. 10c are schematic diagrams of different projection modes in the fourth embodiment of the present invention.

In a first specific implementation mode, as shown in FIG. 10a, when the projecting unit 205 projects in the first mode, the first body 201 stands on a supporting surface through the second surface 2012, and the first surface 2011 has a first angle α which is not zero with the supporting surface. Preferably, the second carrying surface is the supporting surface.

Wherein for the case of the first angle α, the first angle α may be 90 degrees, or larger than 90 degrees, or less than 90 degrees but not zero. Preferably, the first angle α is 90 degrees, and at this time, the first body 101 is upright on the supporting surface, and the projection angle of projecting the content to be projected on the supporting surface is better to facilitate the user to view.

It facilitates the first body 201 to stand on the supporting surface stably. Preferably, the center-of-gravity position of the electronic apparatus is set between the second surface 2012 and the central plane of the electronic apparatus, and the more the center-of-gravity of the electronic apparatus is close to the second surface 2012, the more stable the electronic apparatus is.

Figure 10B:
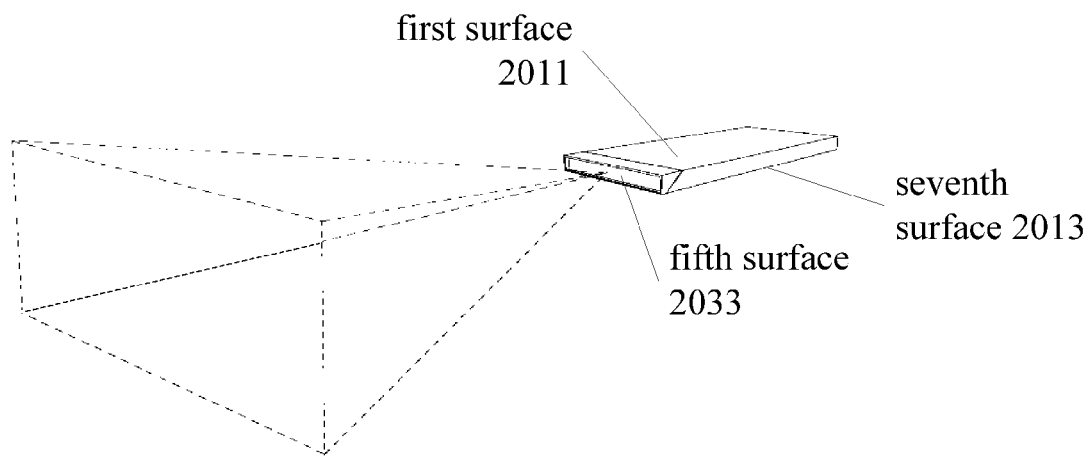

In a second specific implementation mode, as shown in FIG. 10b, when the projecting unit 205 projects in a second mode, the seventh surface 2013 of the first body 201 contacts the supporting surface. Preferably, the first carrying surface is specifically perpendicular to the supporting surface.

Next, the first projection mode and the second projection mode are described in projection path of the projecting unit 205. In this embodiment, it is assumed that the electronic apparatus are in a "standing" status in which the first body 201 stands on the supporting surface through the second surface 2012 and the first surface 2011 has a first angle α which is not zero with the supporting surface.

In a third specific implementation mode, continue to refer to FIG. 10a, when the projecting unit 205 projects in the second mode, the projection path of the projecting unit 205 is projected via a surface which is in the same plane as the first surface 2011 on the second body 203.

Figure 10C:
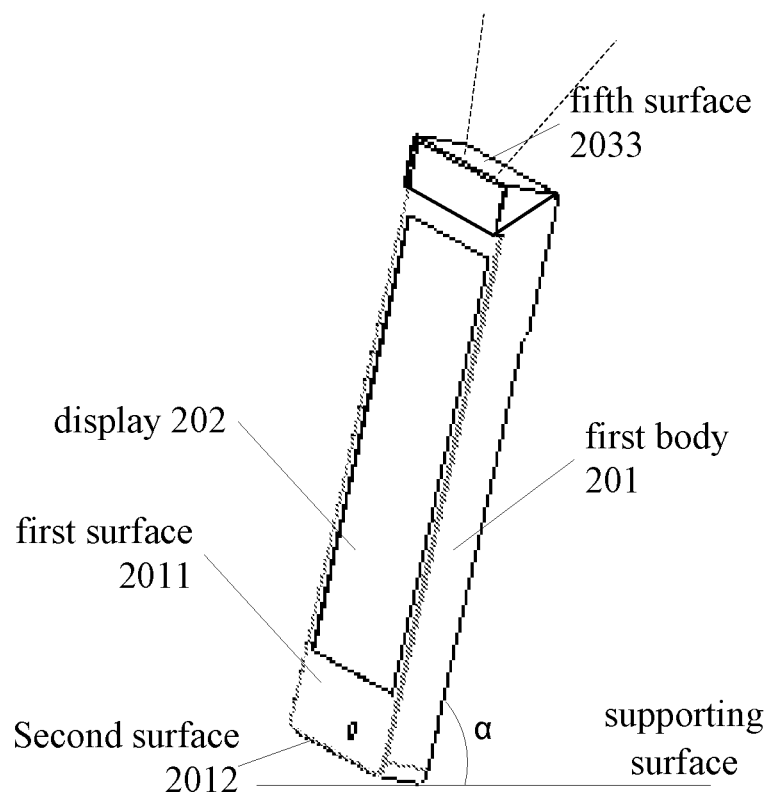

In a fourth specific implementation mode, continue to refer to FIG. 10c, when the projecting unit 205 projects in the first mode, the projection path of the projecting unit 205 is projected via a surface which is in the same plane as the second surface 2012 on the second body 203.

Similarly, when the electronic apparatus are in "laying" status in which the seventh surface 2013 of the first body 201 contacts the supporting surface, the first mode and the second mode can be corresponded to likewise according to difference of the projection paths of the projecting unit 105, and they are not described here.

The first mode and the second mode are described in different two perspectives above respectively, and in practical applications, the mode can be divided by combining these two perspectives. For example, in FIG. 10a, when the projecting unit 205 projects in the second mode, the electronic apparatus is in "standing" status, and the projection path of the projecting unit 205 is projected via a surface which is in the same plane as the first surface 2011 on the second body 203. And when the projecting unit 205 projects in the first mode, the electronic apparatus is in "laying" status, and the projection path of the projecting unit 205 is projected via a surface opposite to the second surface 2012 on the second body 203.

The rotation connecting structure 204 is described next. By referring to FIG. 9 and FIG. 11 at the same time, the rotation connecting structure 204 is specifically provided on the third surface 2014 perpendicularly to make the second body 203 to be able to rotate with respect to the first body 201 in an axial direction which is perpendicular to the third surface 2014.

In a further embodiment, the third surface 2014 has a second angle β with the first surface 2011, the second angle β is an obtuse angle or an acute angle (wherein the FIG. 9 shows the case of an obtuse angle, and the subsequent embodiments are all described by taking the obtuse angle as example, and it is similar to the case of the acute angle). The second body 203 further has a fourth surface 2032 and a fifth surface 2033, the fourth surface 2032 corresponds to the third surface 2014, the fifth surface 2033 is opposite to the second surface 2012, and the rotation connecting structure 204 is connected to the third surface 2014 and the fourth surface 2032 respectively. The second body 203 further has a sixth surface 2031 which intersects the fifth surface 2033.

Further, in this embodiment, the rotation connecting structure 204 is connected to a central position of the third surface 2014 and the fourth surface 2032. When the positional relationship between the sixth surface 2031 and the first surface 2011 is in a first positional relationship, the first body 2012 and the second body 203 have a first relative position. After rotating the second body 203 along the central position through the rotation connecting structure 204 by 180 degrees, the positional relationship between the sixth surface 2031 the first surface 201 is in the second positional relationship. And at this time, the first body 201 and the second body 203 have a second relative position.

Figure 12A:
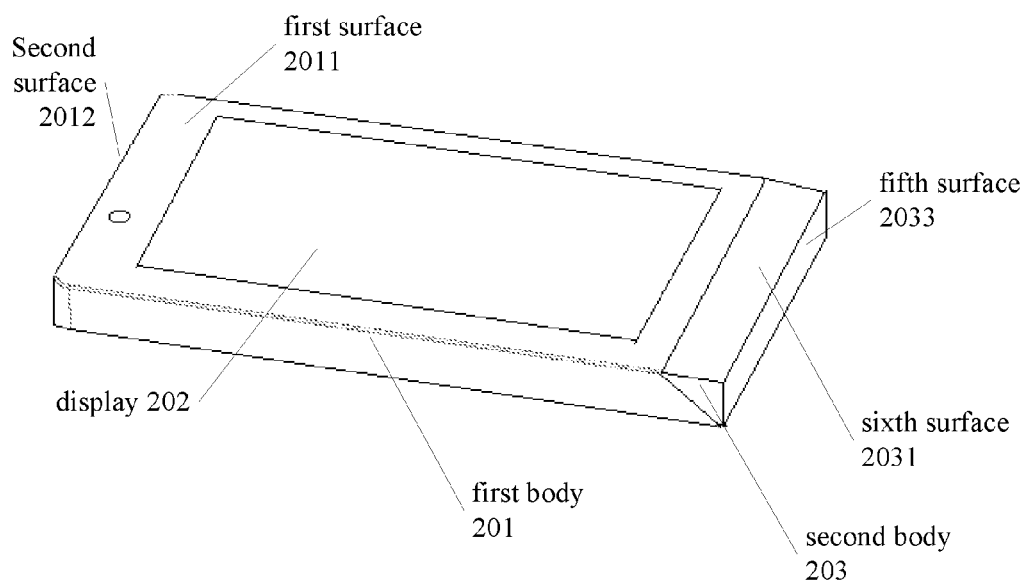
FIG. 12a to FIG. 12c are schematic diagrams of the relative positions between the first body and the second body in the fourth embodiment of the present invention.

As specifically shown in FIG. 12a, the sixth surface 2031 and the first surface 2011 are in the same side of the electronic apparatus, and at this time it is recorded that the positional relationship between the sixth surface 2031 and the first surface 2011 is the first positional relationship. Preferably, in this embodiment, in the first positional relationship, the sixth surface 2031 and the first surface 2011 are in the same plane. In the case that the second angle β is an acute angle, the first positional relationship is specifically that the sixth surface 2031 and the first surface 2011 are in position at two sides of the electronic apparatus, that is, the sixth surface 2031 and the seventh surface 2013 are in two sides of the electronic apparatus. At this time, the sixth surface 2031 and the first surface 200 are opposite to each other. Preferably, in the first positional relationship, the sixth surface 2031 and the seventh surface 2013 are in the same plane.

Figure 12B:
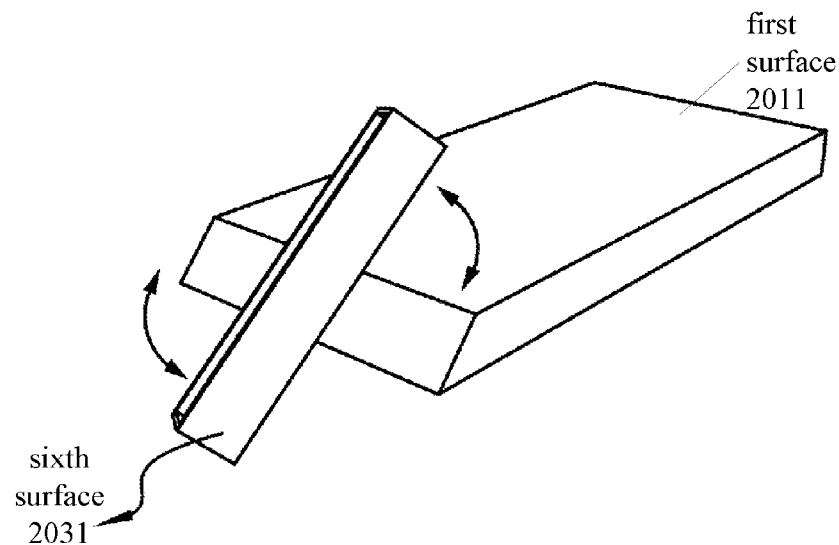
Figure 12C:
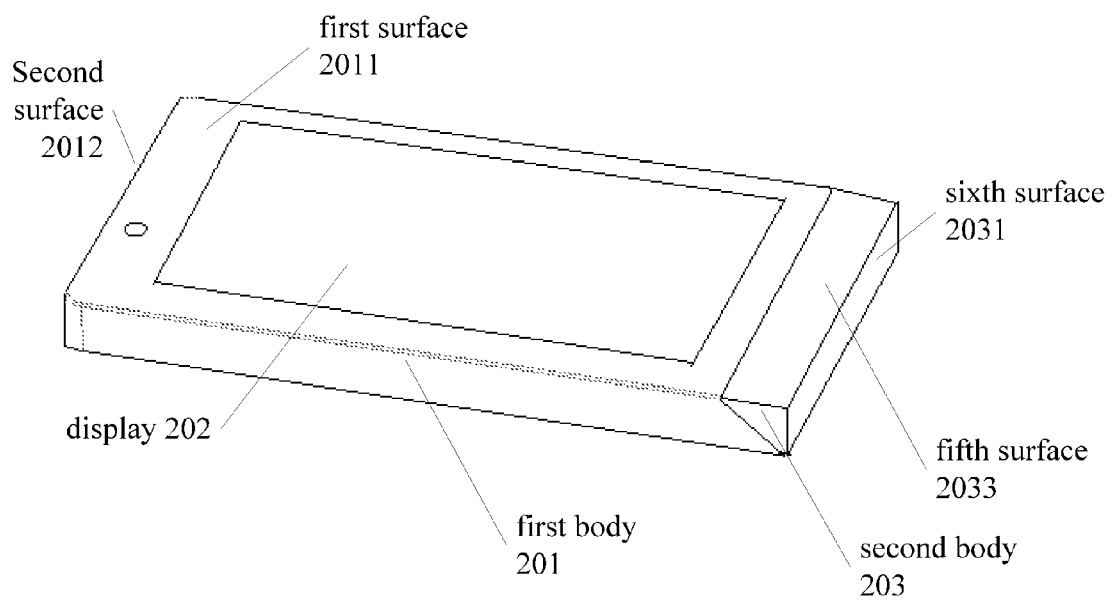

When the second body 203 is rotated around the rotation connecting structure 204, FIG. 12b is referred to, and FIG. 12b is a status after rotating by 90 degrees clockwise from the status of FIG. 12a. And then the rotation goes on, after rotating by 180 degrees, it become a status as shown in FIG. 12c. In FIG. 12c, the sixth surface 2031 has a third angle with the first surface 2011, and the third angle is not zero, that is, the sixth surface 2031 is opposite to the second surface 2012, which is recorded as the second positional relationship. And the fifth surface 2033 and the first surface 2011 are in the same side of the electronic apparatus (the second angle is the obtuse angle), or the fifth surface 2033 and the seventh surface 2013 are in the same side of the electronic apparatus (the second angle is the acute angle).

It can be seen from FIG. 12a and FIG. 12c that, a first appearance form of the electronic apparatus in the first positional relationship is almost same as a second appearance form thereof in the second positional relationship, so unify and integrity of the appearance form of the electronic apparatus are kept. Wherein the terms "almost same", "same" described here are considered in terms of the whole appearance of the electronic apparatus. For example, in terms of the two kinds of appearance forms in FIG. 12a and FIG. 12c, they are basically cuboids (it may be processed as cuboids with rounded Conner for esthetic appearance); in other structures, for example, the second body 203 is a circular cylinder with a tangent plane which is the fourth surface 2032, or may be conical body with a eighth surface, for example, the eighth surface is between the sixth surface 2031 and the fifth surface 2033. In this case, the first appearance form and the second appearance form all keeps the electronic apparatus as appearance form of straight type. And on one hand, the term "almost" means there may be a few of difference between the first appearance form and the second appearance form due to difference of technique, for example, there may be error in position of installation of the rotation connecting structure 204, also for example, the connection circular arc between surface and surface on the second body 203 may have error. On the other hand, the term "almost" means that there may be different structures on the sixth surface 2031 or the fifth surface 2033 or other surface of the second body 203. For example, there is a hole on the sixth surface 2031, and the surface of the fifth surface 2033 is protrusion of wave shape.

Figure 11:
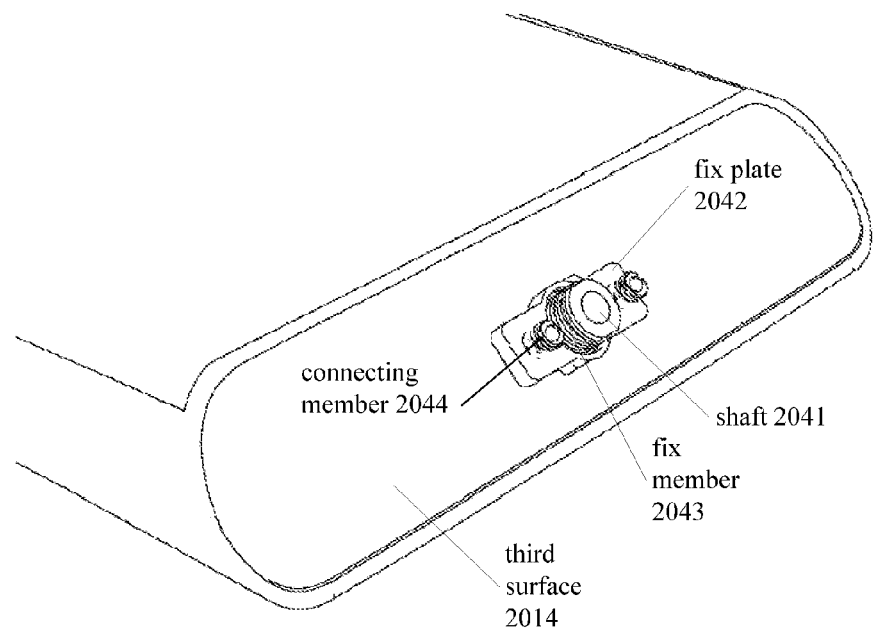
FIG. 11 is a structural diagram of the rotation connecting structure in the fourth embodiment of the present invention.

Continue to refer to FIG. 11, FIG. 11 is a schematic diagram of schematic structure of the rotation connecting structure 204, and, as shown in FIG. 11, the rotation connecting structure 204 includes a shaft having one end fixed to the third surface 2014. A fix plate 2042 is encased on the shaft 2041 and can rotate around the shaft 2041. And then there is a fix member 2043 on the other end of the shaft 1041, and the fix plate 2042 is fixed between the third surface 2014 and the fix member 2043. Further, connecting member 2044 is provided on both ends of the fix plate 2042 and is for connecting to the second body 203. When the second body 203 is connected to the connecting member 2044, if there is external force applied on the second body 203 to bring the second body 203 to rotate, then the second body 203 would bring the fix plate 2042 to rotate around the shaft 2041.

In other embodiments, the rotation connecting structure 204 may also be other structures, as long as ensuring that the second body 203 switches rotatable between the first positional relationship and the second positional relationship through the rotation connecting structure 204.

Further, in practical applications, the structures of the first body 201 and the second body 203 may be other structures, for example, the third surface 2014 is perpendicular to the first surface 2011. In order for the simplicity of the specification, they are no longer listed one by one here.

In further embodiment, a first optical channel is on the fifth surface 2033. When the fifth surface 2033 is opposite to the second surface 2012 and the light out direction of the projecting unit 205 is towards the direction of the fifth surface 2033, the projecting unit 205 can project in a first mode. The projecting unit 205 projects the content to be projected on a first carrying surface through the first optical channel (as shown in FIG. 10b and FIG. 10c).

Further, the second body 203 includes a light path changing unit for changing the light path of the projecting unit 205 when the projecting unit 205 projects in the second mode so that the light path passes a second optical channel on the sixth surface 2031 of the second body 203 to project the content to be projected to a second carrying surface. Wherein the sixth surface 2031 is in the same plane as the first surface 2011 or is opposite to the first surface 2011. In this embodiment, since the light out direction of the projecting unit 205 is the direction towards the fifth surface 2033, so if it wants to project in the second mode, it needs to use the light path changing unit to change the light path of the projecting unit 205, so that the light path passes a second channel on a plane which is on the same plane as the first surface 1011 or on a plane opposite to the first surface 1011 of the second body 203 to go out.

Figure 13:
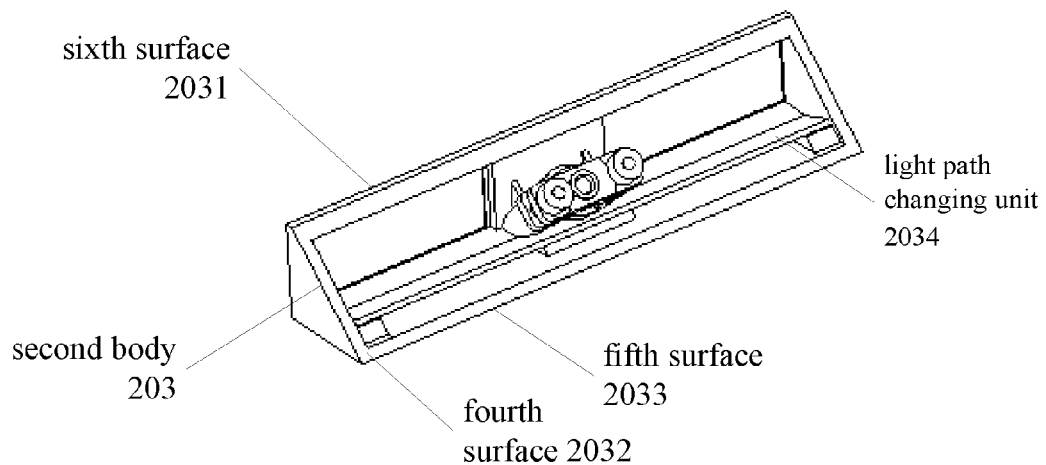
FIG. 13 is a structural diagram of the second body in the fourth embodiment of the present invention.

And, in the rotation connecting structure 204 in FIG. 11 and the structure of the second body 203 in FIG. 9, after the second body 203 rotates by 180 degrees in the above-mentioned axial direction by the rotation connecting structure 204, the fifth surface 2033 is in the same plane as the first surface 2011 (the second angle is the obtuse angle), as shown in FIG. 12c. If the second angle is the acute angle, the fifth surface 2033 is opposite to the first surface 2011, that is, the fifth surface 2033 and the seventh surface 2013 are in the same plane. Referring to FIG. 13 at the same time, FIG. 13 is a diagram of the internal structure of the second body 203. The second body 203 includes a light path changing unit 2034 for changing the light path of the projecting unit 205 when the projecting unit 205 projects in the second mode so that the light path passes a first optical channel on the fifth surface 2033 to project the content to be projected to the second carrying surface.

Wherein for example, the light path changing unit 2034 is specifically a reflector mirror, of course, in other embodiments, it may be other structures, for example, mirror system, and this application does not make any restriction.

When the positional relationship between the sixth surface 2031 and the first surface 2011 changes to the second positional relationship, for example, a status as shown in FIG. 12a, the electronic apparatus is placed on the supporting surface through the seventh surface 2013 as shown in FIG. 10b, and the light path changing unit 2034 does not influence the projected light path any more at this time, so the light path of the projecting unit is along the original light path to pass the first optical channel to project the content to be projected on the first carrying surface.

In the above respective embodiments, as shown in FIG. 9, there is a first open pore 2015 on the third surface 2014, the position of the first open pore 2015 corresponds to the position of the projecting unit 205, the projected light path of the projecting unit 205 can go through the first open pore 2015 to reach the second body 203.

In order to operate the electronic apparatus conveniently, in a specific implementation mode, the electronic apparatus further includes: a gesture detecting unit for detecting whether there is a gesture input at the time of projecting in any one mode of the first mode and the second mode or at the time of projecting in the second mode only; a first processing unit provided in the first body 201 and for responding to the gesture input to execute an operation corresponding to the gesture input when there is the gesture input.

In a first case, that is, no matter whether to project in the first mode or in the second mode, the gesture detecting unit operates to detect whether there is an gesture input, and the electronic apparatus responds to the gesture input through the first processing unit and executes a corresponding operation.

In a second case, only when it is projected in the second mode, the gesture detecting unit operates to detect whether there is a gesture input, or the first processing unit responds to the gesture input.

In a further embodiment, the first processing unit is specifically for: responding to the gesture input to execute an operation corresponding to the gesture input for the content to be projected. That is, in this embodiment, the gesture input is valid only for the projected content, but not influence the content displayed on the display unit 202 directly. Thus, the projected content can be operated more directly and more efficiently.

In practical applications, the gesture detecting unit is provided in the first body, and may be provided in the second body 203. It is explained by taking the gesture detecting unit being provided in the first body 201 as example as follows.

Figure 14:
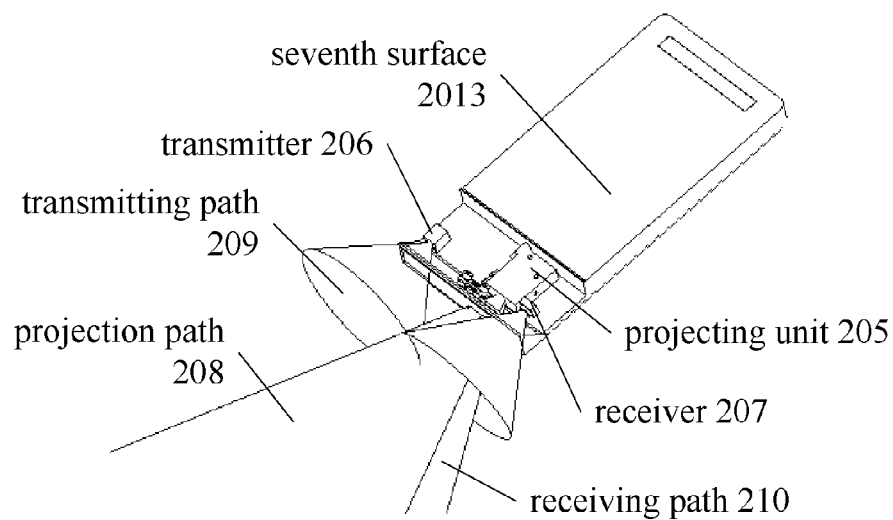
FIG. 14 is a structural diagram of the layout of the element in the fourth embodiment of the present invention.

As shown in FIG. 14, the projecting unit 205 is provided in the first body 201; the projection path 208 of the projecting unit 205 passes the third surface 2014 to go out of the second body 203, so as to project the content to be projected on the carrying surface of the projection region.

For example, the gesture detecting unit specifically includes a transmitter 206 and a receiver 207. The transmitting path 209 of the transmitter 206 and the receiving path 210 of the receiver 207 are the same as the projection path 208, so in spite of which kind of projection mode, the gesture detecting unit can detect the gesture input of the user conveniently. Optionally, the transmitter 206 and the receiver 207 are at left and right sides of the projecting unit 205 respectively. In practical applications, the transmitter 206 and the receiver 207 operate according to principle of the infrared ray.

Of course, in other embodiments, the gesture detecting unit may be other detecting units, for example a camera head.

And for the relationship between the content displayed on the display unit 202 and the content to be projected, it is assumed that a first display content is displayed on a second display interface, a second display content is displayed on the display unit 202, and a third display content is displayed on the first display interface, then the first display content and the second display content may be the same or may be different, the second display content and the third display content may be the same or may be different.

In particular, the first display content and the second display content are the same, it represents the two contents are totally same, for example, both of them are desktop of the electronic apparatus, it is only that the same content are displayed by the display unit 202 and the projecting unit 205 respectively.

If first display content is different from the second display content, there is specifically two kinds of cases, the first kind is they are totally different, that is, both of them has no association there between, for example, a game picture is displayed on the display unit 202 and the first user plays game through the display unit 202, and the first display content projected by the projecting unit 205 is for example a movie picture, and the second user views movie through the projected picture.

The second kind is they are not completely same, for example, two windows are displayed on the display unit 202, one of them is a window of PPT, and the other is a window of movie player, and the user only wants to project the window of PPT to other users to view, at this time, only the window of PPT is projected to the second carrying surface, for example the supporting surface by the projecting unit 205 to facilitate other users to view.

And, the first display content and the third display content are projected content in different projection modes, so they may be the same or may be different, and the relationship between the first display content and the third display content is similar to the description on the relationship between the first display content and the second display content.

The interaction between the first display content and the second display content when the first display content and the second display content are different is described in detail as follows.

The electronic apparatus further includes: a second processing unit for changing status of the first display content based on a trigger operation and changing status of the second display content based on the changed status of the first display content when the change of the status of the first display content reaches a predetermined condition. It is explained by a concrete example as follows.

Figure 15A:
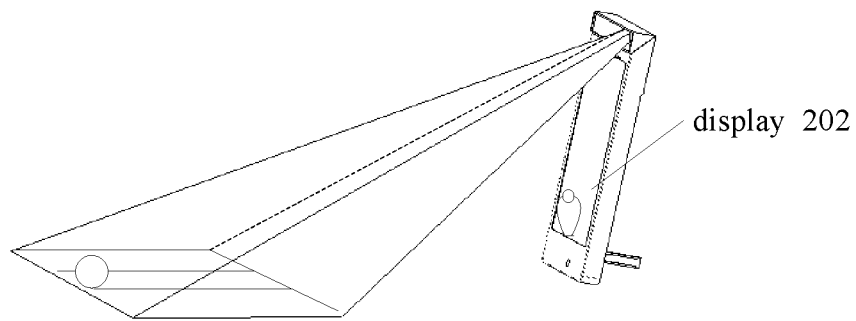
FIG. 15a and FIG. 15b are schematic diagrams of interaction between the projection interface and the display unit in the fourth embodiment of the present invention.
Figure 15B:
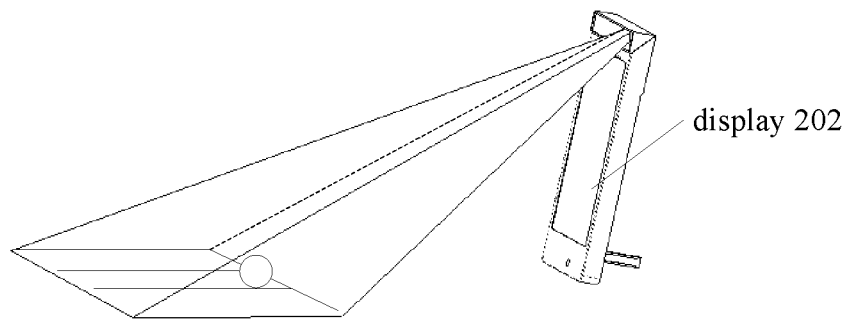

With reference to FIG. 15a, it is assumed that the user wants to play game of bowling, then a game application of bowling is started in the first body 201, and the part of content of bowling bottle is displayed on the display unit 202, then, content corresponding to bowling ball and bowling track is projected to the second display interface by the projecting unit 205. Then, the user can trigger the bowling ball to move along the track, wherein the user triggers the bowling ball to move, for example, the user takes an action of pushing out the bowling ball, and then, the gesture is detected by the above-mentioned gesture detecting unit, the bowling ball is controlled to move along the track, that is, the status of the first display content changes.

When the change of the status of the first display content reaches a predetermined condition, the status of the second display content is changed based on the changed status of the first display content. Continue to refer to FIG. 15b, when the bowling ball moves to the end of the track, for example, the border of the second display interface, then it represents that the bowling ball has arrived at the place of the bowling bottle and hits the bowling bottle at this time, then the second display content is controlled to change status accordingly. In this embodiment, since the bowling ball hits the bowling bottle, the second display content is a status in which the bowling bottle fell down.

The above is only example, and is not for limiting the present invention, in practical applications, many kinds of interactions can be carried out between the display unit 202 and the projection display interface, and they are no longer listed one by one. With the present embodiment, functions of the projection are increased, the man-machine interface is more humanized, and the user's experience is better.

In the above respective embodiments, the electronic apparatus may be a smart phone, a PDA, and may be a tablet computer, or other electronic apparatus that can be held by hand to use.

The one or more technical solutions provided in the above embodiments of the present invention at least have the following technical effects or advantages:

In the embodiments of the present invention, the electronic apparatus includes: the first body; the display unit provided on the first surface of the first body and having the first edge and the second edge which is corresponding to the first edge and parallel to the first edge; the second body; the rotation connecting structure for rotatable connecting the first body and the second body; the projecting unit which is provided in the first body and supports projecting in the first mode and projecting in the second mode;

Wherein when the projecting unit projects in the first mode, the first body and the second body have a first relative position, and the content to be projected is projected to a first projection region corresponding to the projecting unit through a projection path passing the second body, and a first display interface corresponding to the content to be projected is formed on a first carrying surface of the first projection region, the first display interface is on a first side corresponding to a first edge of the display unit;

When the projecting unit projects in the second mode, the first body and the second body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to a second edge of the display unit.

It can be seen that, firstly, the electronic apparatus in the present embodiment has two kinds of modes of projection, and in different modes of projection, the display interfaces to which the content to be projected is projected is on different sides of the display unit, so it solves the technical problem that there is only one mode of projection in the prior arts so the mode of projection is single and projection angle and projection carrying surface are limited, and achieves the technical effect that one projector equipment has two kinds of projection modes which increases application scene of the projector equipment. Secondly, in this embodiment, with the rotation connecting structure, the first body has two kinds of positional relationship with the second body, and different projection modes are implemented by different positional relationships, so the structure is simple, and it is easy to operate and use.

Here, those skilled in the art can understand that, in the description of the electronic apparatus and the control method according to the first embodiment to the third embodiment of the present invention and the electronic apparatus according to the fourth embodiment of the present invention, though some wordings are different, but they refer to the substantially same components. For example, the main body in the description of the electronic apparatus and the control method according to the first embodiment to the third embodiment of the present invention corresponds to the first body in the description of the electronic apparatus according to the fourth embodiment of the present invention, and the assistant body corresponds to the second body, the connecting device corresponds to the rotation connecting structure, and so on. Those skilled in the art can understand such correspondence relationship clearly based on the above description of the specification, thus it is no longer described here.

And, those skilled in the art can understand that, in the case that the electronic apparatus includes the projecting unit, the status switching in the technical solution of the electronic apparatus and the control method according to the first embodiment to the third embodiment of the present invention may also include switch of the projection mode, that is, the switch of the projection mode can be regarded as a concrete form of the switch of the working status of the electronic apparatus.

Therefore, the electronic apparatus and the control method according to the first embodiment to the third embodiment of the present invention and the electronic apparatus according to the fourth embodiment of the present invention can be used individually as above mentioned, or can be used in combination with each other.

When the electronic apparatus and the control method the first embodiment to the third embodiment of the present invention are used individually, the electronic apparatus and the control method according to the embodiments of the present invention can be configured as follows:

(1) An electronic apparatus including:
a main body provided with a display unit positioned at a first surface of the main body;
an assistant body;
a connecting device for connecting the main body and the assistant body; a status switching device for switching the working status of the electronic apparatus from a first status to a second status which is different from the first status when the positional relationship between the main body and the assistant body satisfies a preset condition.

(2) The electronic apparatus according to the above (1), wherein a first instruction to which the electronic apparatus is able to respond in the first status is different from a second instruction to which the electronic apparatus is able to respond in the second status.

(3) The electronic apparatus according to the above (1), wherein a first display content of the display unit of the electronic apparatus in the first status is different from a second display content of the display unit in the second status.

(4) The electronic apparatus according to the above (1), wherein a first resource occupied by the electronic apparatus in the first status is different from a second resource occupied by the electronic apparatus in the second status.

(5) The electronic apparatus according to the above (1), wherein when the positional relationship between the main body and the assistant body satisfies different preset conditions, the corresponding second status is different.

(6) The electronic apparatus according to the above (1), wherein:
the working status is specifically: an application scene mode, and the first status and the second status are specifically: a first application scene mode and a second application scene mode; or
the working status is specifically: a system status, and the first status and the second status are specifically: a first system status and a second system status, wherein the first system status is a normal operating status, and the second system status is a non-working status; or the working status is specifically: invoking an application, and the first status and the second status are specifically: invoking a first application and invoking a second application; wherein the first application is different from the second application; or the working status is specifically the collection of the operating system and hardware, the first status is a complete set of the collection of the first operation system and hardware, and the second status is a part of the collection of the second operation system and hardware.

(7) The electronic apparatus according to the above (6), wherein when the working status is specifically invoking an application, the electronic apparatus further includes:

a first processing unit for obtaining a current system status of the electronic apparatus and deciding whether the current system status is in a normal operating status or a non-working status;

the status switching device is specifically further for: switching the current system status to the normal operating status when the current system status is in the non-working status and invoking the second application.

(8) The electronic apparatus according to the above (1), wherein the assistant body is detachably connected to the main body by the connecting device.

(9) The electronic apparatus according to the above (8), wherein the positional relationship between the main body and the assistant body satisfying the preset condition is specifically: the assistant body being connected to the main body or the assistant body being separated from the main body.

(10) The electronic apparatus according to the above (9), wherein when the number of the assistant body is greater than or equal to 2, the first status and the second status corresponding to each assistant body are different from each other.

(11) The electronic apparatus according to the above (1), wherein the assistant body is rotatable connected to the main body by the connecting device, and the assistant body includes an operational region which is for operating a display interface of the display unit, when the assistant body is in a second relative position with respect to the main body, in comparison to when the assistant body is in a first relative position with respect to the main body, a first operational body at the bottom of the electronic apparatus is more suitable for the user to hold to carry out an input operation to the operational region.

(12) An electronic apparatus, including:

a main body provided with a display unit positioned at a first surface of the main body;

a connecting device;

an assistant body which is rotatable connected to the main body by the connecting device, and the assistant body including an operational region which is for operating a display interface of the display unit; when the assistant body is in a second relative position with respect to the main body, in comparison to when the assistant body is in a first relative position with respect to the main body, a first operational body at the bottom of the electronic apparatus is more suitable for the user to hold to carry out an input operation to the operational region.

(13) The electronic apparatus according to the above (12), wherein the electronic apparatus further includes a first processing unit, and the assistant body includes a micro-control unit for processing the input operation collected by the operational region as an instruction and feeding the instruction back to the first processing unit.

(14) The electronic apparatus according to the above (12), wherein the electronic apparatus further includes a status switching device for switching the working status of the electronic apparatus from a first status to a second status which is different from the first status when positional relationship between the main body and the assistant body satisfies a preset condition.

(15) The electronic apparatus according to the above (12), wherein the electronic apparatus further includes an instruction switching device for switching an instruction set to which the operational region is able to respond from a first instruction set in the first status to a second instruction set in the second status, wherein the first instruction set is not completely the same as the second instruction set.

(16) A control method applied in an electronic apparatus including a main body, a connecting device, an assistant body and a status switching device, the assistant body being able to connected to the main body by the connecting device, the method includes:

detecting whether a positional relationship between the main body and the assistant body satisfies a preset condition;

switching working status of the electronic apparatus from a first status to a second status which is different from the first status by the status switching device when the positional relationship between the main body and the assistant body satisfies the preset condition.

(17) The method according to the above (16), wherein a first instruction to which the electronic apparatus is able to respond in the first status is different from a second instruction to which the electronic apparatus is able to respond in the second status.

(18) The method according to the above (16), wherein a first display content of the display unit of the electronic apparatus in the first status is different from a second display content of the display unit in the second status.

(19) The method according to the above (16), wherein a first resource occupied by the electronic apparatus in the first status is different from a second resource occupied by the electronic apparatus in the second status.

(20) The method according to the above (16), wherein when the positional relationship between the main body and the assistant body satisfies different preset conditions, the corresponding second status is different.

(21) The method according to the above (16), wherein:

the working status is specifically: an application scene mode, and the first status and the second status are specifically: a first application scene mode and a second application scene mode; or the working status is specifically: a system status, and the first status and the second status are specifically: a first system status and a second system status, wherein the first system status is a normal operating status, and the second system status is a non-working status; or the working status is specifically: invoking an application, and the first status and the second status are specifically: invoking a first application and invoking a second application; wherein the first application is different from the second application; or the working status is specifically the collection of the operating system and hardware, the first status is a complete set of the collection of the first operation system and hardware, and the second status is a part of the collection of the second operation system and hardware.

(22) The method according to the above (21), wherein when the working status is specifically invoking an application, before the status switching device switching the working status of the electronic apparatus from a first status to a second status which is different from the first status, the method specifically includes:

obtaining a current system status of the electronic apparatus;

deciding whether the current system status is in a normal operating status or a non-working status;

switching the current system status to the normal operating status when the current system status is in the non-working status; and invoking the second application.

(23) The method according to the above (16), wherein the assistant body is detachably connected to the main body by the connecting device.

(24) The method according to the above (23), wherein detecting whether the positional relationship between the main body and the assistant body satisfies the preset condition is specifically:

detecting whether the assistant body is connected to the main body or the assistant body is separated from the main body, and the positional relationship satisfies the preset condition when the assistant body is connected to the main body; or the positional relationship satisfies the preset condition when the assistant body is separated from the main body.

(25) The method according to the above (24), wherein when the number of the assistant body is greater than or equal to 2, the first status and the second status corresponding to each assistant body are different from each other.

(26) The method according to the above (16), wherein the assistant body is rotatable connected to the main body by the connecting device, and the assistant body includes an operational region which is for operating a display interface of the display unit, when the assistant body is in a second relative position with respect to the main body, in comparison to when the assistant body is in a first relative position with respect to the main body, a first operational body at the bottom of the method is more suitable for the user to hold to carry out an input operation to the operational region; the method further includes:

receiving a first input operation through the operational region;

generating a first control instruction based on the first input operation; and executing the first control instruction to operate the display interface.

(27) A control method applied in an electronic apparatus including a main body, a connecting device and an assistant body, the assistant body being rotatable connected to the main body by the connecting device, the assistant body including an operational region, the method includes:

receiving a first input operation through the operational region;

generating a first control instruction based on the first input operation; and executing the first control instruction to operate a display interface of a display unit of the electronic apparatus, wherein when the assistant body is in a second relative position with respect to the main body, in comparison to when the assistant body is in a first relative position with respect to the main body, a first operation body at the bottom of the electronic apparatus is more suitable for the user to hold to carry out an input operation to the operational region.

(28) The method according to the above (27), wherein the assistant body includes a micro-control unit, and generating the first control instruction based on the first input operation is specifically:

processing the first input operation as the first control instruction by the micro-control unit.

(29) The method according to the above (27), wherein the method further includes:

detecting whether a positional relationship between the main body and the assistant body satisfies a preset condition;

switching working status of the electronic apparatus from a first status to a second status which is different from the first status by the status switching device when the positional relationship between the main body and the assistant body satisfies the preset condition.

(30) The method according to the above (29), wherein the method further includes:

switching an instruction set to which the operational region is able to respond from a first instruction set in the first status to a second instruction set in the second status, wherein the first instruction set is not completely the same as the second instruction set.

when the electronic apparatus and the control method according to the first embodiment to the third embodiment of the present invention and the electronic apparatus according to the fourth embodiment of the present invention are used in combination with each other, that is, when the switch of the projection mode is regarded as a concrete form of the switch of the working status of the electronic apparatus, the electronic apparatus and the control method according to the embodiments of the present invention can be configured as follows:

(31) The electronic apparatus according to any one of the above (1) to (15), further including:

a projecting unit which is provided in the main body and supports projecting in a first mode and projecting in a second mode;

wherein the display unit has a first edge and a second edge which is corresponding to the first edge and parallel to the first edge;

the connecting device is a rotation connecting structure for rotatable connecting the main body and the assistant body; and the status switching unit switching the working status of the electronic apparatus from the first status to the second status which is different from the first status specifically includes:

the status switching unit switching the projecting unit of the electronic apparatus from projecting in the first mode to projecting in the second mode;

when the projecting unit projects in the first mode, the main body and the assistant body have a first relative position, and the content to be projected is projected to a first projection region corresponding to the projecting unit through a projection path passing the assistant body, and a first display interface corresponding to the content to be projected is formed on a first carrying surface of the first projection region, the first display interface is on a first side corresponding to the first edge of the display unit;

when the projecting unit projects in the second mode, the main body and the assistant body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

(32) The electronic apparatus according to the above (31), wherein the main body further includes a second surface, the second surface intersects the first surface and is close to the second edge, when the projecting unit projects in the first mode, the main body stands on a supporting surface through the second surface, the first surface has a first angle which is not zero with the supporting surface, and the second carrying surface is specifically the supporting surface.

(33) The electronic apparatus according to the above (32), wherein the main body further includes a third surface, the third surface intersects the first surface, and is close to the first edge and opposite to the second surface, the connecting device is specifically provided on the third surface perpendicularly, so that the second body is able to rotate with respect to the main body in an axial direction which is perpendicular to the third surface.

(34) The electronic apparatus according to the above (31), wherein the third surface has a second angle with the first surface, the second angle is an obtuse angle or an acute angle, and the assistant body has a fourth surface and a fifth surface, the fourth surface responds to the third surface, and the fifth surface intersects the fourth surface, the connecting device is connected to the fourth surface.

(35) The electronic apparatus according to the above (34), wherein the fifth surface has a first optical channel thereon, and when the fifth surface is opposite to the second surface and a light out direction of the projecting unit is a direction towards the fifth surface, the projecting unit is able to project in the first mode, and the projecting unit projects the content to be projected on the first carrying surface through the first optical channel.

(36) The electronic apparatus according to the above (35), wherein the assistant body includes:

a light path changing unit for changing the light path of the projecting unit when the projecting unit projects in the second mode, so that the light path passes a second optical channel on a sixth surface of the assistant body to project the content to be projected on the second carrying surface, wherein the sixth surface is in the same plane as the first surface or is opposite to the first surface.

(37) The electronic apparatus according to the above (35), wherein after the assistant body rotates by 180 degrees in the axial direction through the connecting device, the fifth surface is in the same plane as the first surface or is opposite to the first surface, and the assistant body includes:

a light path changing unit for changing the light path of the projecting unit when the projecting unit projects in the second mode so that the light path passes the first optical channel to project the content to be projected on the second carrying surface.

(38) The electronic apparatus according to the above (33), wherein the provided position of the connecting device corresponds to the position of the projecting unit, so that the light path of the projecting unit passes the connecting device to reach the assistant body.

(39) The electronic apparatus according to the above (31), wherein the electronic apparatus further includes:

a gesture detecting unit for detecting whether there is a gesture input when it projects in any one mode of the first mode and the second mode or it projects only in the second mode;

a second processing unit provided in the main body and for responding to the gesture input to execute an operation corresponding to the gesture input when there is the gesture input.

(40) The electronic apparatus according to the above (39), wherein the second processing unit is specifically for: responding to the gesture input to execute the operation corresponding to the gesture input for the content to be projected.

(41) The electronic apparatus according to the above (39), wherein the gesture detecting unit is provided in the main body, and a light path of the gesture detecting unit is same as the projection path of the projecting unit.

(42) The electronic apparatus according to the above (31), wherein a first display content displayed on a second display interface is different from a second display content displayed on the display unit, the electronic apparatus further includes:

a third processing unit for changing status of the first display content based on a trigger operation and changing status of the second display content based on the changed status of the first display content when the change of the status of the first display content reaches a predetermined condition.

(43) The control method according to any one of the above (16) to (30), wherein the electronic apparatus further includes:

a projecting unit which is provided in the main body and supports projecting in a first mode and projecting in a second mode; and the display unit has a first edge and a second edge which is corresponding to the first edge and parallel to the first edge;

the connecting device is a rotation connecting structure for rotatable connecting the main body and the assistant body; and the status switching device switching the working status of the electronic apparatus from the first status to the second status which is different from the first status specifically includes:

the status switching device switching the projecting unit of the electronic apparatus from projecting in the first mode to projecting in the second mode;

when the projecting unit projects in the first mode, the main body and the assistant body have a first relative position, and the content to be projected is projected to a first projection region corresponding to the projecting unit through a projection path passing the assistant body, and a first display interface corresponding to the content to be projected is formed on a first carrying surface of the first projection region, the first display interface is on a first side corresponding to the first edge of the display unit;

when the projecting unit projects in the second mode, the main body and the assistant body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

(44) The control method according to the above (43), wherein the main body further includes a second surface, the second surface intersects the first surface and is close to the second edge, when the projecting unit projects in the first mode, the main body stands on a supporting surface through the second surface, the first surface has a first angle which is not zero with the supporting surface, and the second carrying surface is specifically the supporting surface.

(45) The control method according to the above (44), wherein the main body further includes a third surface, the third surface intersects the first surface, and is close to the first edge and opposite to the second surface, the connecting device is specifically provided on the third surface perpendicularly, so that the second body is able to rotate with respect to the main body in an axial direction which is perpendicular to the third surface.

(46) The control method according to the above (45), wherein the third surface has a second angle with the first surface, the second angle is an obtuse angle or an acute angle, and the assistant body has a fourth surface and a fifth surface, the fourth surface corresponds to the third surface, and the fifth surface intersects the fourth surface, the connecting device is connected to the fourth surface.

(47) The control method according to the above (46), wherein the fifth surface has a first optical channel thereon, and when the fifth surface is opposite to the second surface and a light out direction of the projecting unit is a direction towards the fifth surface, the projecting unit is able to project in the first mode, and the projecting unit projects the content to be projected on the first carrying surface through the first optical channel.

(48) The control method according to the above (47), further including:

changing the light path of the projecting unit when the projecting unit projects in the second mode, so that the light path passes a second optical channel on a sixth surface of the assistant body to project the content to be projected on the second carrying surface, wherein the sixth surface is in the same plane as the first surface or is opposite to the first surface.

(49) The control method according to the above (47), wherein after the assistant body further rotate by 180 degrees in the axial direction through the connecting device, the fifth surface is in the same plane as the first surface or is opposite to the first surface, and the control method further includes:

changing the light path of the projecting unit when the projecting unit projects in the second mode so that the light path passes the first optical channel to project the content to be projected on the second carrying surface.

(50) The control method according to the above (45), further including:

setting position of the connecting device to correspond to position of the projecting unit, so that the light path of the projecting unit passes the connecting device to reach the assistant body.

(51) The control method according to the above (43), further including:

detecting whether there is a gesture input when it projects in any one mode of the first mode and the second mode or it projects only in the second mode; and responding to the gesture input to execute an operation corresponding to the gesture input when there is the gesture input.

(52) The control method according to the above (51), wherein:

responding to the gesture input to execute an operation corresponding to the gesture input when there is the gesture input is specifically:

responding to the gesture input to execute the operation corresponding to the gesture input for the content to be projected.

(53) The control method according to the above (52), wherein a first display content displayed on a second display interface is different from a second display content displayed on the display unit, and the control method further includes:

changing status of the first display content based on a trigger operation and changing status of the second display content based on the changed status of the first display content when the change of the status of the first display content reaches a predetermined condition.

When the electronic apparatus according to the fourth embodiment of the present invention is used individually, the electronic apparatus according to the embodiments of the present invention can be configured as follows:

(54) An electronic apparatus, including:

a first body;

a display unit which is provided on a first surface of the first body and has a first edge and a second edge which is corresponding to the first edge and parallel to the first edge;

a second body;

a rotation connecting structure for rotatable connecting the first body and the second body;

a projecting unit which is provided in the first body and supports projecting in a first mode and projecting in a second mode; and wherein when the projecting unit projects in the first mode, the first body and the second body have a first relative position, and the content to be projected is projected to a first projection region corresponding to the projecting unit through a projection path passing the second body, and a first display interface corresponding to the content to be projected is formed on a first carrying surface of the first projection region, the first display interface is on a first side corresponding to the first edge of the display unit; and when the projecting unit projects in the second mode, the first body and the second body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

(55) The electronic apparatus according to the above (54), wherein the first body further includes a second surface, the second surface intersects the first surface and is close to the second edge, when the projecting unit projects in the first mode, the first body stands on a supporting surface through the second surface, the first surface has a first angle which is not zero with the supporting surface, and the second carrying surface is specifically the supporting surface.

(56) The electronic apparatus according to the above (55), wherein the first further includes a third surface, the third surface intersects the first surface, and is close to the first edge and opposite to the second surface, the rotation connecting structure is specifically provided on the third surface perpendicularly, so that the second body is able to rotate with respect to the first body in an axial direction which is perpendicular to the third surface.

(57) The electronic apparatus according to the above (56), wherein the third surface has a second angle with the first surface, the second angle is an obtuse angle or an acute angle, and the second body has a fourth surface and a fifth surface, the fourth surface corresponds to the third surface, and the fifth surface intersects the fourth surface, the rotation connecting structure is connected to the fourth surface.

(58) The electronic apparatus according to the above (57), wherein the fifth surface has a first optical channel thereon, and when the fifth surface is opposite to the second surface and a light out direction of the projecting unit is a direction towards the fifth surface, the projecting unit is able to project in the first mode, and the projecting unit projects the content to be projected on the first carrying surface through the first optical channel.

(59) The electronic apparatus according to the above (58), wherein the second body includes:

a light path changing unit for changing the light path of the projecting unit when the projecting unit projects in the second mode, so that the light path passes a second optical channel on a sixth surface of the second body to project the content to be projected on the second carrying surface, wherein the sixth surface is in the same plane as the first surface or is opposite to the first surface.

(60) The electronic apparatus according to the above (58), wherein after the second body rotate by 180 degrees in the axial direction through the rotation connecting structure, the fifth surface is in the same plane as the first surface or is opposite to the first surface, and the second body includes:

a light path changing unit for changing the light path of the projecting unit when the projecting unit projects in the second mode so that the light path passes the first optical channel to project the content to be projected on the second carrying surface.

(61) The electronic apparatus according to the above (56), wherein the provided position of the rotation connecting structure corresponds to the position of the projecting unit, so that the light path of the projecting unit passes the rotation connecting structure to reach the second body.

(62) The electronic apparatus according to the above (54), wherein the electronic apparatus further includes:

a gesture detecting unit for detecting whether there is a gesture input when it projects in any one mode of the first mode and the second mode or it projects only in the second mode;

a first processing unit provided in the first body and for responding to the gesture input to execute an operation corresponding to the gesture input when there is the gesture input.

(63) The electronic apparatus according to the above (62), wherein the first processing unit is specifically for: responding to the gesture input to execute the operation corresponding to the gesture input for the content to be projected.

(64) The electronic apparatus according to the above (62), wherein the gesture detecting unit is provided in the first body, and a light path of the gesture detecting unit is same as the projection path of the projecting unit.

(65) The electronic apparatus according to the above (54), wherein a first display content displayed on a second display interface is different from a second display content displayed on the display unit, the electronic apparatus further includes:

a second processing unit for changing status of the first display content based on a trigger operation and changing status of the second display content based on the changed status of the first display content when the change of the status of the first display content reaches a predetermined condition.

Here, those skilled in the art can understand, other than the above manners, the electronic apparatus and the control method according to the first embodiment to the third embodiment of the present invention as well as the electronic apparatus according to the fourth embodiment of the present invention can be combined with each other in other manners, the embodiments of the present invention do not intend to make any restriction thereto.

Each embodiment of the present invention is described in detail above. However, those skilled in the art should understand, these embodiments can be made various modifications, combination or sub-combination without departing from the principle and spirit of the present invention, and such modification should fall into the scope of the present invention.

Those skilled in the art should understand that, the embodiments of the present invention can be provided as a method, a system or a computer program product. Therefore, the present invention can adopt forms of a full hardware embodiment, a full software embodiment, or an embodiment combining software and hardware aspects. And, the present invention can adopt forms of computer program product implemented on one or more computer usable storage mediums (including, but not limited to magnetic disk storage, CD-ROM, optical memory or the like) including computer usable program codes.

The present invention is described by referring to flow charts and/or block diagrams of method, apparatus (system) and computer program product according to the embodiments of the present invention. It should be understood that each flow and/or block in the flow charts and/or block diagrams and the combination of the flow and/or block in the flow charts and/or block diagrams can be implemented by computer program instruction. These computer program instructions can be provided to processors of a general purpose computer, a dedicated computer, an embedded processor or other programmable data processing apparatus to generate a machine, so that a device for implementing functions specified in one or more flows of the flow charts and/or one or more blocks of the block diagrams is generated by the instructions executed by the processor of the computer or other programmable data processing apparatus.

These computer program instructions can also be stored in computer readable storage which is able to direct the computer or other programmable data processing apparatus to operate in specific manners, so that the instructions stored in the computer readable storage generate manufactured articles including commander equipment, which implements functions specified by one or more flows in the flow charts and/or one or more blocks in the block diagrams.

These computer program instructions can be loaded to computer or other programmable data processing apparatus, so that a series of operation steps are executed on the computer or other programmable apparatus to generate computer implemented process, so that the instructions executed on the computer or other programmable apparatus provide steps for implementing functions specified in one or more flows of the flow charts and/or one or more blocks of the block diagrams.

Further, it needs to note that, in the specification, terms "comprise", "include" and any other variations thereof intend to cover nonexclusive inclusion so that the procedure, the method, the product or the equipment including a series of elements includes not only these elements, but also other elements which are not listed explicitly, or also inherent elements of these procedure, method, product or equipment. In a case that there is no more limitation, the element defined by statement "including one . . . " does not exclude there is an additional same element in the procedure, method, article or apparatus including the element.

Finally, it should note that, the above-described series of processing do not only comprise processing executed chronologically in the order mentioned here, and also comprise processing executed in parallel or individually but not chronologically.

Though some embodiments of the present invention are shown and described, those skilled in the art should understand, these embodiments can be carried out various modifications without departing from the principle and spirit of the present invention, and such modifications should fall into the scope of the present invention.

The invention claimed is:

1. An electronic apparatus comprising:
a main body provided with a display unit positioned at a first surface of the main body;
an assistant body;
a connecting device for connecting the main body and the assistant body; and
a status switching device for switching a working status of the electronic apparatus from a first status to a second status which is different from the first status when the positional relationship between the main body and the assistant body satisfies a preset condition,
wherein a first instruction to which the electronic apparatus is able to respond in the first status is different from a second instruction to which the electronic apparatus is able to respond in the second status,
the working status includes an application scene mode, the first status includes a webpage operation mode and the second status includes a video operation mode; or
the working status includes the collection of the operating system and hardware, the first status is a complete set of the collection of the first operation system and hardware, and the second status is a part of the collection of the second operation system and hardware, and
wherein, the assistant body is detachably connected to the main body,
the positional relationship between the main body and the assistant body satisfies a preset condition that comprises the assistant body is connected to the main body or the assistant body is not connected to the main body, and when the number of the assistant body is greater than or equal to two, the first status or the second status corresponding to each assistant body are different from each other.

2. The electronic apparatus according to claim 1, wherein a first display content of the display unit of the electronic apparatus in the first status is different from a second display content of the display unit in the second status.

3. The electronic apparatus according to claim 1, wherein a first resource occupied by the electronic apparatus in the first status is different from a second resource occupied by the electronic apparatus in the second status.

4. The electronic apparatus according to claim 1, wherein when the positional relationship between the main body and the assistant body satisfies different preset conditions, the corresponding second status is different.

5. The electronic apparatus according to claim 1, wherein when the working status includes invoking an application, the electronic apparatus further includes:
a processing unit for obtaining a current system status of the electronic apparatus and deciding whether the current system status is in the normal operating status or the non-working status;
the status switching device further includes switching the current system status to the normal operating status when the current system status is in the non-working status and invoking the second application.

6. The electronic apparatus according to claim 1, wherein the assistant body is rotatably connected to the main body by the connecting device, and the assistant body includes an operational region which is for operating a display interface of the display unit, when the assistant body is in a second relative position with respect to the main body, in comparison to when the assistant body is in the first relative position with respect to the main body, a first operational body at the bottom of the electronic apparatus is more suitable for the user to hold to carry out an input operation to the operational region.

7. The electronic apparatus according to claim 1, further comprises:
the display unit provided on the first surface of the first body and having a first edge and a second edge which is corresponding to the first edge and parallel to the first edge; and
a projecting unit which is provided in the main body and supports projecting in a first mode and projecting in a second mode;
wherein, the connecting device is a rotation connecting structure for rotatable connecting the main body and the assistant body; and
the status switching unit switching the working status of the electronic apparatus from the first status to the second status which is different from the first status and includes:
the status switching unit switching the projecting unit of the electronic apparatus from projecting in the first mode to projecting in the second mode;
when the projecting unit projects in the first mode, the main body and the assistant body have a first relative position, and the content to be projected is projected to a first projection region corresponding to the projecting unit through a projection path passing the assistant body, and a first display interface corresponding to the content to be projected is formed on a first carrying surface of the first projection region, the first display interface is on a first side corresponding to the first edge of the display unit;
when the projecting unit projects in the second mode, the main body and the assistant body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

8. The electronic apparatus according to claim 7, wherein the main body further includes a second surface, the second surface intersects the first surface and the second surface and is close to the second edge, when the projecting unit projects in the first mode, the main body stands on a supporting surface through the second surface, the first surface has a first angle which is not zero with the supporting surface, and the second carrying surface comprises the supporting surface.

9. The electronic apparatus according to claim 8, wherein the main body further includes a third surface, the third surface intersects the first surface, and is close to the first edge and opposite to the second surface, the connecting device is provided on the third surface perpendicularly, so that the second body is able to rotate with respect to the main body in an axial direction which is perpendicular to the third surface.

10. The electronic apparatus according to claim 9, wherein the third surface has a second angle with the first surface, the second angle is an obtuse angle or an acute angle, and the assistant body has a fourth surface and a fifth surface, the fourth surface corresponds to the third surface, and the fifth surface intersects the fourth surface, the connecting device is connected to the fourth surface.

11. The electronic apparatus according to claim 10, wherein the fifth surface has a first optical channel thereon, when the fifth surface is opposite to the second surface and the light out direction of the projecting unit is towards the direction of the fifth surface, the projecting unit is able to project in the first mode, the projecting unit projects the content to be projected on the first carrying surface through the first optical channel.

12. The electronic apparatus according to claim 11, wherein the assistant body includes:
 a light path changing unit for changing the light path of the projecting unit when the projecting unit projects in the second mode, so that the light path passes a second optical channel on a sixth surface of the assistant body to project the content to be projected on the second carrying surface, wherein the sixth surface is in the same plane as the first surface or is opposite to the first surface.

13. The electronic apparatus according to claim 11, wherein after the assistant body rotates by 180 degrees in the axial direction through the connecting device, the fifth surface is in the same plane as the first surface or is opposite to the first surface, and the assistant body includes:
 a light path changing unit for changing the light path of the projecting unit when the projecting unit projects in the second mode so that the light path passes the first optical channel to project the content to be projected on the second carrying surface.

14. The electronic apparatus according to claim 9, wherein the provided position of the connecting device corresponds to the position of the projecting unit, so that the light path of the projecting unit passes the connecting device to reach the assistant body.

15. The electronic apparatus according to claim 7, further comprising:
 a gesture detecting unit for detecting whether there is a gesture input when it projects in any one mode of the first mode and the second mode or it projects only in the second mode; and
 a second processing unit provided in the main body and for responding to the gesture input to execute an operation corresponding to the gesture input when there is the gesture input.

16. The electronic apparatus according to claim 7, wherein a first display content displayed on a second display interface is different from a second display content displayed on the display unit, the electronic apparatus further includes:
 a third processing unit for changing status of the first display content based on a trigger operation and changing status of the second display content based on the changed status of the first display content when the change of the status of the first display content reaches a predetermined condition.

17. A control method applied in an electronic apparatus including a main body, a connecting device, an assistant body and a status switching device, the assistant body being able to connect to the main body by the connecting device, the method includes:
 detecting whether a positional relationship between the main body and the assistant body satisfies a preset condition; and
 switching working status of the electronic apparatus from a first status to a second status which is different from the first status by the status switching device when the positional relationship between the main body and the assistant body satisfies the preset condition,
 wherein a first instruction to which the electronic apparatus is able to respond in the first status is different from a second instruction to which the electronic apparatus is able to respond in the second status,
 the working status includes an application scene mode, the first status includes a webpage operation mode and the second status includes a video operation mode; or
 the working status includes the collection of the operating system and hardware, the first status is a complete set of the collection of the first operation system and hardware, and the second status is a part of the collection of the second operation system and hardware, and
 wherein, the assistant body is detachably connected to the main body,
 the positional relationship between the main body and the assistant body satisfies a preset condition that comprises the assistant body is connected to the main body or the assistant body is not connected to the main body, and when the number of the assistant body is greater than or equal to two, the first status or the second status corresponding to each assistant body are different from each other.

18. An electronic apparatus, comprising:
 a first body;
 a display unit which is provided on a first surface of the first body and has a first edge and a second edge which is corresponding to the first edge and parallel to the first edge;
 a second body;
 a rotation connecting structure for rotatable connecting the first body and the second body;
 a projecting unit which is provided in the first body and supports projecting in a first mode and projecting in a second mode; and
 wherein when the projecting unit projects in the first mode, the first body and the second body have a first relative position, and the content to be projected is projected to a first projection region corresponding to the projecting unit through a projection path passing the second body, and a first display interface corresponding to the content to be projected is formed on a first carrying surface of the first projection region, the first display interface is on a first side corresponding to the first edge of the display unit;
 when the projecting unit projects in the second mode, the first body and the second body have a second relative position which is different from the first relative position, and the content to be projected is projected to a second projection region corresponding to the projecting unit, and a second display interface corresponding to the content to be projected is formed on a second carrying surface of the second projection region, the second display interface is on a second side corresponding to the second edge of the display unit.

* * * * *